United States Patent Office 3,476,562
Patented Nov. 4, 1969

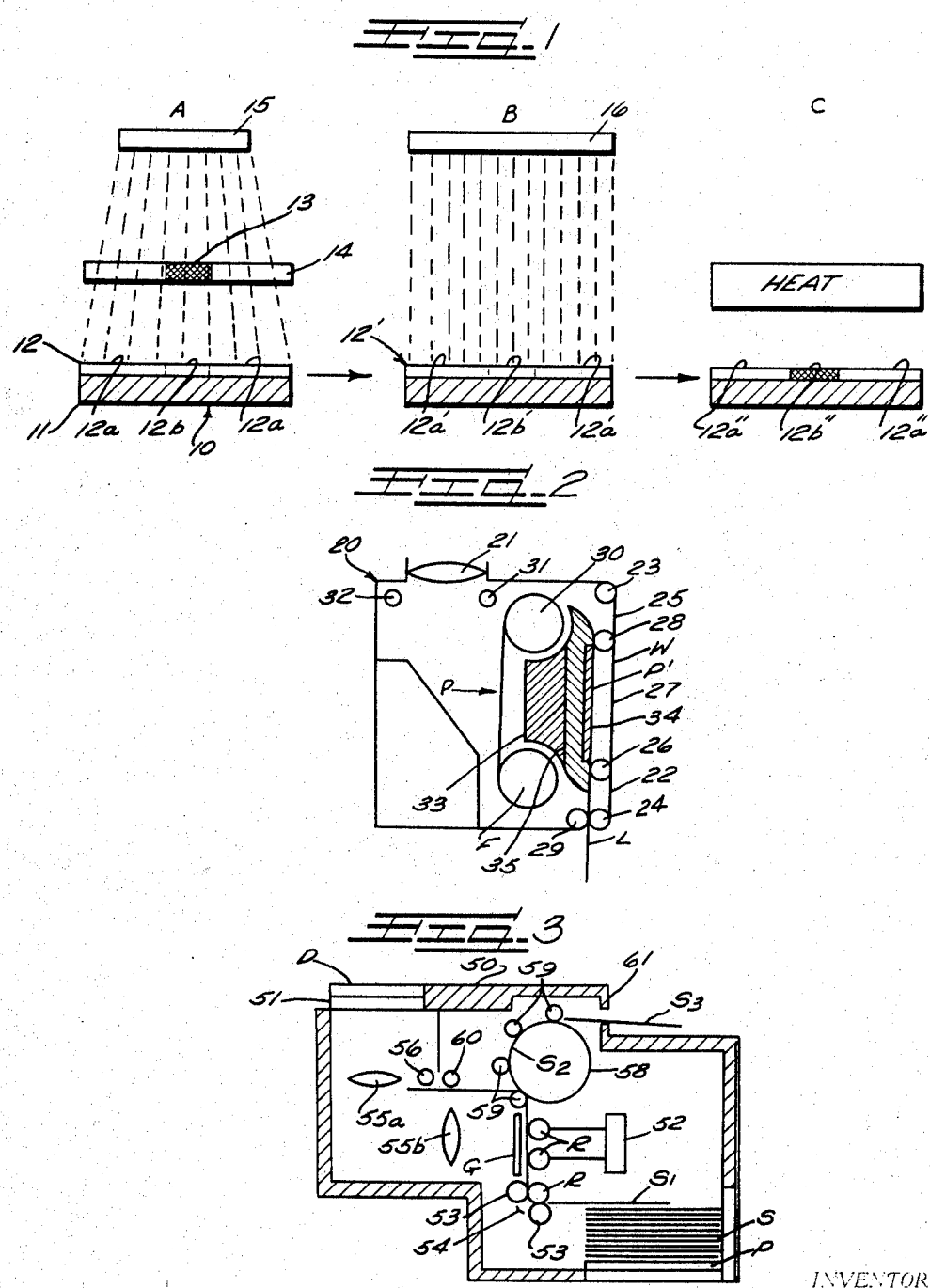

3,476,562
LIGHT SENSITIVE COMPOSITION COMPRISING AN ORGANIC AMINE AND AN ORGANIC HALOGEN COMPOUND IN A HYDROPHILIC BINDER
Yoshikazu Yamada, Sierra Madre, and Thomas H. Garland, El Monte, Calif., assignors to Bell & Howell Company, Chicago, Ill., a corporation of Illinois
Continuation-in-part of applications Ser. No. 278,050, May 6, 1963, and Ser. No. 352,625, Mar. 17, 1964. This application Aug. 23, 1965, Ser. No. 481,759
Int. Cl. G03c 1/72
U.S. Cl. 96—88         10 Claims

ABSTRACT OF THE DISCLOSURE

A photosensitive composition and method for preparation thereof, in which an aryl amine or N-vinyl compound and organic halogen compound are dispersed in a normally hydrophilic continuous phase. Positive and negative mode photosensitivity is obtained.

---

The instant invention relates generally to the photographic art, and more particularly, to improved methods of producing photographic or photosensitive compositions, films or articles, and to improved photographic methods relating thereto, and the instant invention further relates to the photographic or photosensitive compositions, films or articles obtained. This application is a continuation-in-part of our application Ser. No. 278,050, filed May 6, 1963, now abandoned entitled "Production and Use of Photosensitive Compositions and Films" and application Ser. No. 352,625, now abandoned filed March 17, 1964, entitled "Dye Sensitization of Photosensitive Materials."

The instant invention relates to compositions which are sensitive to light and which are suitable for photography and photographic reproduction purposes. The instant invention also relates to the preparation of such compositions, and photographic films or similar articles from such compositions. The instant invention also relates to the production of stable, colored, printout and developable images produced by exposure to light and/or to light and heat of certain photosensitive combinations of materials or agents.

In general, it is old and well known in the photographic arts to provide photographic systems involving two or more materials which react under the influence of actinic light to produce a color. As early as 1921 Murry C. Beebe and his co-workers described numerous photographic systems, involving in some instances halogen compounds (e.g. iodoform and others) in allegedly color-producing association with other materials such as tung oil varnish, which could contain colored aromatic amine dyes such as rhodamine (U.S. Patent No. 1,574,357), asphaltum (U.S. Patent Nos. 1,575,143 and 1,587,271), phenolic condensation products (U.S. Patent No. 1,587,271), and miscellaneous others (U.S. Patent Nos. 1,587,273; 1,587,274; 1,604,674; 1,618,505; 1,655,127; 1,658,510; and 1,820,-593). Beebe also disclosed an alleged photographic use for the known photo-condensation of furfural and aniline which involved photo-sensitizing a mixture thereof "by adding a small amount of iodoform, or any compound which will liberate iodine when it is exposed to light" (U.S. Patent No. 1,587,269, page 2, lines 89–93); and Beebe referred to this last-mentioned patent disclosure later (in U.S. Patent No. 1,587,272) in adding condensations of benzaldehyde and aniline, dimethyl aniline or benzyl aniline to his list of systems allegedly responsive to actinic light in the presence of sensitizing agents such as iodoform.

Even up to the present time, workers have continued to study photographic systems of the general type which involve actinic light induced color-forming reactions between two or more materials. In U.S. Patents Nos. 3,042,515; 3,042,516; 3,042,517; 3,042,518; 3,042,519; 3,046,125; and 3,056,673; issued to Eugene Wainer and U.S. Patent No. 3,082,086, issued to Robert Sprague, photographic systems are described involving photosensitive systems of materials which include halogen-containing and nitrogen-containing compounds. Other recent disclosures include British Patent No. 917,919 and Belgian Patent No. 596,094.

Although the instant invention is not limited to the use of the aforesaid systems, or the theories and/or principles described in such patents, it will be apparent from the following description of the instant invention that many of the various materials described in these patents to Beebe, Wainer and/or Sprague may be used in the practice of the instant invention. In fact, the instant invention contemplates the use of two or more ingredients, each of which per se may have been known in the prior art, and which may have been understood by prior workers in the art to be capable of coreaction in response to actinic light to produce colors. The instant invention, however, involves certain new and unique methods of combination and certain new and unique combinations of such materials. The combinations of the invention are novel in physical and/or chemical aspects thereof, and the methods of producing the same are also novel with respect to physical and/or chemical aspects. These combinations of the invention, and the compositions and physical state in which they are produced in the practice of the invention, have been found to produce a number of advantages in the field of photography, which include improved and controlled photosensitivity, economic and simplified formulation, superior photographic results and the like.

It is, therefore, an important object of the instant invention to provide improved photographic compositions, films or other articles, and improved methods of producing and/or using the same, including improved photographic processes and/or devices for carrying out such processes.

Other and further objects, features and advantages of the present invention will become apparent to those skilled in the art from the following detailed description thereof and the drawings attached hereto and made a part hereof.

ON THE DRAWINGS

FIGURE 1 is an essentially diagrammatic view showing a photographic sequence of a preferred embodiment of the invention;

FIGURE 2 is an essentially diagrammatic view of a camera station arrangement adapted for use in the practice of a preferred embodiment of the invention; and FIGURE 3 is an essentially diagrammatic view of still another camera station sequence for a preferred embodiment of the instant invention.

AS SHOWN ON THE DRAWINGS

In FIGURE 1 a photographic sequence is indicated generally by the three stations designated A, B and C, which represent a sequence for a positive-working photographic system of the invention. In the first step A, a photosensitive element of the invention indicated generally by the reference numeral 10 is provided with a paper backing 11 and a photosensitive film or layer 12 which is subjected to an "imagewise exposure" by being exposed to the projection of an image 13 of a color transparency 14, with such image 13 being projected by a conventional source 15 of visible actinic light, which in this particular instance is a tungsten lamp (indicated diagrammatically). The actinic light from the source 15 is absorbed by the image 13 but otherwise passes through the transparency 14 so as to impose a latent image in photosensitive layer 12. The areas 12a, 12a thus exposed on the photosensitive layer 12 are referred to as "light struck" whereas the area 12b (behind the image 13) is referred to as a "non-light struck" area. The non-light struck area 12b indicated at station A is, of course, not exposed to such actinic light.

Next, at station B, the previously exposed photographic film or layer 12′ is subjected to a blanket or "non-image" exposure from a second light source 16, which in this case is a "black light" or near ultraviolet light source (i.e. wavelength of about 3000–4000 A.). The previously exposed or light struck image areas 12a′ as well as the previously unexposed or non-light struck image area 12b′ are thus both exposed to actinic light, but in the embodiment of the invention, the actinic light source 16 does not develop color in previously exposed image areas 12a′. The light source 16 may or may not develop color in the previously unexposed image area 12b′, or as indicated at station C, the color in such previously unexposed image area 12b″ is more fully developed by heat. In the positive working system here described, however, the color forming capacity of the initially exposed or light struck image areas 12a is apparently lost by the initial exposure to light from the source 15 (through the transparent portions of the transparency 14); and the subsequent blanket exposure to ultraviolet light 16 at station B, plus heating at station C merely results in development of a white, or tint in the areas 12a″, whereas the image at 12b″ develops color.

The instant invention, however, involves substantially more than the foregoing positive-working photographic sequence and includes positive-working procedures wherein the second light source 16 is also of visible actinic light, but of greater intensity than the first light source 15, or which is the same exact light source 15, but blanket exposure of the layer 12′ is of a longer duration than is the initial image-wise exposure of layer 12. Thus, the instant invention involves positive-working photographic procedures wherein the second blanket exposure is of a different wavelength-intensity-exposure or light than is the first deactivating, image-wise exposure, which second exposure provides a shorter wavelength, higher intensity and/or longer exposure time than said first exposure.

This invention also involves negative-working procedures wherein an image-wise wavelength-intensity-exposure of light is used to establish a color or color-forming tendency in the light-struck areas. The background is then "fixed" against color formation by chemical means or by subsequent blanketing with a deactivating, non-color yielding, wavelength-intensity-exposure of light.

The instant invention also provides novel photosensitive compositions and methods for preparing such compositions which allow the use of the above procedures. Broadly, photosensitive compositions of this invention are prepared by homogeneously dispersing at least two starting agents $a$ and $b$ in a dispersing medium $c$, in which $a$ and $b$ are substantially insoluble, under appropriate time-temperature-agitation conditions and forming an emulsion containing a combination $ab$ in the form of fine discrete particles or globules. It is important that both $a$ and $b$ are, in the absence of a solvent, substantially insoluble in $c$ and that at least one of such starting agents be either molten or else be liquefied by a solvent. The term "molten" is used herein to signify materials which are liquid, regardless of whether or not such materials are liquid at room temperature or are liquefied by fusion or by heat, but does not signify liquefaction by a solvent.

When no solvent is used and at least one of the starting agents is molten, dispersion can be accomplished by agitation such as is obtained by use of a Waring Blendor, a ball mill, or other shearing, grinding or otherwise "violent" stirring or dispersing means. When a solvent is used to liquefy at least one of the starting agents, suitable emulsions can be formed with only mild stirring, but smaller particle sizes are more readily obtained with more "violent" agitation as described.

Broadly then, one method of obtaining emulsions suitable for use in this invention comprises subjecting a photosensitive dispersion consisting essentially of (1) a photosensitive dispersed phase comprising at least two starting agents, at least one of which is molten, in a (2) dispersion medium formed of a solid-film-forming vehicle, in which said starting agents are substantially insoluble, to time-temperature-agitation conditions and effecting formation of discrete globules of a light-absorbing combination of at least two such starting agents, said combination being responsive to actinic light to yield an image of selective light absorptivity distinct from that of said combination and said starting agents.

The emulsions are, of course, prepared in the substantial absence of actinic light.

It is preferred that one of the starting agents, $b$, used in this invention be an organic halogen compound and, when no solvent is used to aid dispersion, that the other starting agent, $a$ be molten.

It is preferred that the other starting agent, $a$, be a nitrogen compound containing certain structural characteristics. Thus we prefer nitrogen atom-containing compounds in which a nitrogen atom is attached directly to at least one benzene ring, said benzene ring being free from carbon atom substitution in the position para to said nitrogen atom attachment. Such compounds generally yield better color formation in conjunction with a light-struck organic halogen compound than do compounds containing a benzene ring having a carbon atom substituted in the position para to the nitrogen atom attachement.

We have also found that nitrogen atom-containing compounds in which the nitrogen atom is a member of a heterocyclic ring are particularly suitable for use in this invention.

Still another type of nitrogen atom-containing compound of particular usefulness in this invention is an N-vinyl compound, notably in the positive-working systems.

It will be appreciated that there is substantial overlap between the above types of compounds and that many compounds useful in this invention can be considered as falling within one, two or even all three of the above terms; e.g., N-vinyl carbazole. It will also be appreciated that there is no generic term available in accepted chemical terminology that will effectively embrace all of the above preferred types of nitrogen atom-containing compounds. It is merely important, in these preferred aspects of the invention, to choose a compound which has at least one of the above characteristics. In narrower embodiments, as will be amplified hereinafter, we prefer choosing compounds with more than one of the above characteristics.

Examples of the above types of compounds include the nitrogen atom-containing compounds mentioned in the above noted patents to Wainer, Sprague and Beebe, and the disclosures of these patents are incorporated herein by reference. Compounds of particular effectiveness include N-vinyl carbazole, N-ethyl carbazole, indole and diphenylamine.

It will be appreciated that the solid-film-forming component used in the practice of the instant invention in the previously described phase $c$ may be any of a number of materials such as proteins (i.e. casein, gelatin, zein, thiolated gelatin), alginate, gums, starch derivatives, and the like materials which are generally considered to be natural or derivatives of natural film-forming materials.

In addition, synthetic water-soluble solid-film formers may also be used to particular advantage in the practice of the instant invention, using an aqueous continuous phase $c$, and such materials include polyvinyl alcohol, commercially available water-soluble polyacrylics (e.g. water-soluble polyacrylic acid salts having substantially the molecular weight and water compatibility of the polyvinyl alcohol), various commercially available amine or amide aldehyde resins (e.g. A-stage and B-stage urea-formaldehyde, thiourea-formaldehyde, dicyandiamide-formaldehyde, melamine-formaldehyde, benzoguanamine-formaldehyde, and the like resins prepared in the presence of slight excess of borax or similar alkaline agent to retard condensation during the emulsification and heating procedures of the invention, but to permit later curing of the resins to form a film), and the like. In addition to the essentially synthetic water-soluble resins capable of forming self-sustaining films and maintaining the dispersed phase of the invention in non-agglomerated form, there are a number of cellulose derivative film formers, which include the various water-soluble cellulose ethers, carboxymethylcellulose, hydroxypropylmethylcellulose, and the like. In addition, mixtures of any of the above described materials may be used.

Any order of adding and/or dispersing the reagents may be used as long as a dispersion of $ab$ in $c$ results. Thus, compound $a$ can be dispersed in the medium $c$ and then $b$ added as is or as an emulsion in a separate portion of $c$. The combination is then further dispersed. Likewise, compound $b$ can be dispersed in $c$ and then $a$ added as is or as an emulsion in a separate portion of $c$. Also, both compounds $ab$ can be added to $c$ before dispersion of either and the mixture can then be dispersed. Another method is to pre-fuse compounds $a$ and $b$ to form $ab$ which is then dispersed, as per this invention, in $c$. Another method is to pre-particulate $a$ and $b$ in one type of $c$, and then disperse that type of $c$ (containing $a$ and $b$) in another type of $c$.

Heat may be applied during blending but, in general, need not be. In the usual case, the dispersing effect of the blender will raise the temperature of the dispersion. In those cases where a starting compound has a melting point higher than the temperature obtained from the dispersing action, heat may be applied to maintain the temperature of the dispersion above the melting point of the compound. When a solvent is used, the blending temperature is generally less since the compounds are more readily dispersed. Heat may be applied, if desired, to more quickly volatilize and drive off the solvent after substantial emulsification.

The blending temperature will also depend on the nature of the binder, the solvent if any, the method of blending, the geometry of the blending system and the ease of blending. For example, using a Waring Blendor, temperatures of 55–75° F. are common. With a ball mill, lower temperatures, e.g., room temperature to about 40° C. are generally obtained. When compounds $ab$ are pre-fused, lower blending temperatures are desirable to prevent pre-reaction and the blendor may be cooled, e.g., by packing it in ice.

Blending times also depend on the speed of blending, violence of the agitation, viscosity and melting points of the materials involved, presence or absence of a solvent, and temperature of the blending system. In general, with moderate heat and only mild agitation, e.g., in the presence of a solvent, blending times of from about 5–10 minutes yield emulsions of comparatively large grain size, e.g., about 10–30 microns. Increasing the blending times in such a system to about 10–60 minutes tends to reduce the size of the particles, as will increasing the blending temperature. With greater agitation, as described above, particle sizes of about 0.3–10 microns can be obtained in from a few seconds, at very high agitation, to about 10 minutes, at more moderate but still high agitation.

It is believed that various aspects of the invention will be made apparent from consideration of an initial detailed example of a preferred embodiment of the invention, as follows:

EXAMPLE 1

Run 1A

A charge of $a$, 5 g. of N-vinylcarbazole (M.P. 65–67° C.), as a starting agent, and $c$ 8 g. of gelatin in 29 ml. of water (preferably containing about 2 drops of a foam depressant "Dow-Corning Antifoam B" understood to be a dimethylpolysiloxane fluid), as a continuous phase, is violently agitated at high speed in a Waring Blendor, with heating up to a temperature of 70–72° C. primarily as a result of the dispersing effect of the blender over a period of 10–15 minutes, with such high speed agitation being continued at such temperature for a time (e.g. 2–3 minutes in this run) sufficient to obtain a substantially uniform "agent-in-water" emulsion (which time is preferably held to the minimum permitted to obtain a uniform emulsion). Once the dispersed agent is liquefied, its fundamental characteristics such as particle size, etc. may be controlled within limits by selection of time-temperature-agitation conditions.

At this stage, the substantially uniform emulsion is understood to comprise $c$ an aqueous gelatin substantially-translucent-solid-film-forming vehicle, functioning as the continuous liquid phase, containing intimately dispersed therein a dispersed phase consisting essentially of $a$ N-vinylcarbazole in molten or liquefied form reduced by the viscosity differences between the phases and the violent agitation to substantially fine-sized, discrete, rounded, generally spheroidal (if not actually spherical) globules (i.e. liquefied dispersed particles) which are substantially insoluble in the continuous phase $c$.

Next, a charge of $b$ 5 g. of carbon tetrabromide (M.P. 92° C.), as a second starting agent, is added to the blender with continued high speed agitation at the temperature of 70–72° C. until a substatnially uniform emulsion is again obtained, which takes 1–2 minutes (which time is preferably held to the minimum permitted to obtain a uniform emulsion, and avoid excessive premature reaction between the dispersed phase agents).

At this stage, the emulsion is understood to comprise substantially the same continuous phase system $c$ with a different dispersed phase wherein the molten N-vinylcarbazole $a$ has fused with the carbon tetrabromide $b$, which starting agents $a$ and $b$ are believed to be miscible under these conditions, to form a new combination $ab$ that is in molten or liquefied form reduced by the viscosity differences between the phases and the violent agitation to substantially fine-sized, discrete, rounded, generally spheroidal globules, which are substantially insoluble in the continuous phase $c$.

As soon as the substantially uniform emulsion of the previous paragraph is obtained, the emulsion is applied as a 3 mil (wet thickness) film (using the Bird coating bar drawdown technique) onto sheets of baryta-coated paper. The dispersed phase combination $ab$ solidifies quickly in situ in the film-forming vehicle $c$ as the emulsion is cooled, to form substantially uniformly sized, discrete, substantially non-agglomerated, generally spheroidal solidified particles, having an average particle size or diameter of about 2–4 microns (within an approximate range of about 0.3 to about 10 microns).

The paper sheets with the wet film coatings thereon are placed in a dark room drier at room temperature for about ½ hour, to obtain formation of a dry solid continuous phase $c$, i.e., that is dry to the touch, whereby a clear substantially transparent continuous phase film is obtained having a uniform mild yellow background color, imparted thereto by the dispersed phase combination $ab$. This film is photosensitive and (with certain exceptions hereinafter noted) it should be kept until ready for use in the substantial absence of strong actinic light and the preparation thereof including the production of the emulsion itself hereinbefore described is, of course, carried out in the substantial absence of such actinic light. An advantage of the invention is that the extreme precautions ordinarily taken to protect against actinic light in silver photography need not be taken with this particular system.

The starting agents $a$ and $b$ are each separate and distinct light absorbers; each is substantially colorless as such (when dispersed or dissolved in a transparent inert carrier); and each is substantially insoluble in the continuous phase $c$ (in liquid or solid form). The co-fusion, co-liquefication and/or solution (and/or mutual plasticization) which takes place in situ in the continuous phase $c$ between the starting agents $a$ and $b$ results in a very intimate, substantially homogeneous combination $ab$ during such violent agitation and heating, and, during the overall time-temperature cycle here used, such dispersed phase combination $ab$ ultimately solidifies in situ in the continuous phace $c$, in a system characteristic of an intrinsic colloid, evidenced in part by non-agglomeration of such solidified (or solidifying) particles, which highly desirable property is believed to be enhanced by such solidification in situ.

The dispersed solidified combination $ab$ is understood to possess within the individual particles substantial homogeneity characteristic of the solid solution state, and although the existence of the academically true solid solution is very difficult to evaluate, as a practical matter these particles possess homogeneity such that they are here characterized as being solid solutions. The combination $ab$ also is a separate and distinct light absorber, which in this particular case differs from the substantially colorless starting agents $a$ and $b$ in that it possesses a distinct but mild yellowish hue, thereby indicating blue light absorption. The change from the substantially colorless starting agents $a$ and $b$ to the colored combination $ab$ in the practice of the invention demonstrates that this particular combination $ab$ is more than a purely physical solid solution or similar type of combination; and it is, in fact, a chemical combination of at least a complex, if not a truly new chemical compound, which is evidenced by the color formation. Moreover, it will be seen that this chemical combination is not merely premature photo-development or photo-chemical reaction, since this photosensitive dispersed phase combination $ab$ is capable in response to sequential exposure to actinic light and heat of conversion in one instance to a whitish image, and in another instance to a pronounced blue-green image, with each such images involving light absorptivity separate and distinct from each other, from that of the combination $ab$ and from that of the individual starting agents $a$ and $b$.

The change in light absorptivity obtained in the yellow photosensitive combination $ab$ from that of either starting agent $a$ or $b$ does not, however, necessarily involve complete chemical change and/or complete loss of chemical identity of the starting agents $a$ and $b$ at this stage. In fact, the indication is that each particle of the combination has the characteristics of a solid solution of $a$ and/or $b$ and the interaction products, i.e., the colored complex or chemical reaction product $ab$ thereof, because of the apparent molecular intimacy of association of the components evidenced by their ready reactivity and high photosensitivity. For example, if heating of the uniform emulsion of the combination $ab$ is continued for long periods at 70–72° C. or at higher temperatures further reaction is evidence by additional color changes which under certain circumstances would indicate more interaction of starting agents $a$ and $b$. Certain characteristics of this continuing chemical type reaction during a given time-temperature cycle may be demonstrated by fusing agents $a$ and $b$ alone together under carefully controlled conditions and observing the visible color change, but fusion together in the instant emulsion system affords distinct advantages in control of this type of reaction (as evidenced by the color obtained), so that the desired superphotosensitivity can be obtained in the resulting emulsion film.

In this respect, it will be understood that the term "light absorptivity" (or the term "light absorber" of actinic light) is understood to involve a substantial of significant quantitative and qualitative absorber of actinic light (within the available wavelength range of actinic light). Even if this combination $ab$ were purely physical, e.g., in solid solution only, the different characteristic light absorptivity thereof can be (and in many such combinations of the invention probably is) the result merely of the creation of a physical system within the particle wherein a given particular light absorption characteristic (in quantity and/or quality) will dominate. In the instant Example 1 this is apparent visually, giving evidence of chemical reaction; but in other combinations of the invention not involving a visible change, the change in light absorptivity is usually measurable, even though it may not involve a visible color change.

POSITIVE-WORKING SYSTEM OF RUN 1A

A sheet of baryta-coated paper with the dried emulsion film applied thereto (as described in Run 1A) is then initially exposed (image-wise) for two seconds to a positive color transparency projection (4½ diameters), 300 w. Bell and Howell Headliner slide projector (which uses a tungsten lamp providing wavelength in the range of 4000–7800 A.). Next, the sheet is subjected to a second exposure for 15 seconds by actinic near ultraviolet light from a set of two 15 w. black light blue lamps (which provide predominantly 3000–4000 A.), which second exposure is a blanket exposure, followed by heating the film to about 70° C. for about 10 seconds to obtain a positive picture, which appears (on a white background) as blue or greenish-blue during such heating.

Although it is not desired to limit this aspect of the invention to any particular theory, it is believed that the initial image-wise exposure to actinic light effects a latent image formation, in which the exposed areas or light struck areas of the photosensitive combination $ab$ are substantially deactivated in the sense that it will not produce color in the subsequent process; and it is believed that this "deactivation" is probably caused by initial photo-polymerization via the N-vinyl group. Such initial photopolymerization may involve the formation of only the N-vinyl dimer or trimer, or only an irreversible "predisposition" to form such polymers (in the later blanket, i.e., development, exposure to actinic light and/or heat); but it does deactivate the color-forming capacity of the combination in the initially exposed or light struck image area. This color-forming capacity is not lost in the initially non-exposed or non-light struck image areas (which are not "light struck" during the initial exposure); and the subsequent blanket near ultraviolet light and heat exposure brings out a clear faithful positive image.

The above description explains roughly how a positive copy is produced. Actually, the density of the color formed in any given small area by the blanket UV exposure and heat is inversely proportional to the extent of the original visible light exposure received by that area. The greater this visible light exposure, the less the color density developed by the subsequent UV exposure and heat. Thus, tone rendition is possible.

We have also found that the same light source or light of the same wavelength band can be used for both the imaging and the development exposures. Thus, it is possible to make an imaging exposure with a tungsten light source, then to develop the picture with the same tungsten light. A picture taken in a camera can be developed with the same sunlight used to form the image. These possibilities have been realized.

A specific example of the above type of positive working system may be demonstrated as follows:

EXAMPLE 2

A charge of 5 grams of N-vinylcarbazole and a previously prepared continuous phase of 10 grams of water-soluble starch ether in 50 grams of water is agitated at high speed in a Waring Blendor, with heating up to a temperature of 70–72° C. primarily as a result of the dispersing effect of the blender, to obtain a substantially uniform emulsion, and a charge of 0.25 gram of hexachloroethane is then added and the violent agitation is continued at a temperature of 70–72° C. for 2 or 3 more minutes. Although hexachloroethane sublimes at a relatively high temperature, it is found that the hexachloroethane readily combines with the molten N-vinylcarbazole in the dispersed phase and upon cooling and filming the system the resulting particle size is found to be within the range of 0.3 to 10 microns. After the film (6 mil wet thickness) has been dried in a dark room, it is given a brief (10 second) image-wise exposure to ultraviolet light (3000–3800 A.), and this is followed by a 30-second heating to about 350° F. Next, the film is given a blanket exposure to the same ultraviolet source for 30 seconds followed by heating to about 350° F. to develop a yellow-brown positive picture.

In this case, the same UV source was used for both the imaging and developing exposures. The difference between the two exposures was simply in the exposure time, the imaging exposure being shorter than the development exposure.

Other photo systems of this invention can be both imaged and developed by the same light source to produce a positive photograph.

EXAMPLE 3

In order to conclusively prove that the same light source can be used for both the imaging and blanketing exposures in making a positive picture, emulsions of this invention were exposed to a monochromatic beam at various wavelengths. Additionally, formulations were made in which a dye sensitizer was incorporated in order to extend the spectral sensitivity of the system and provide further confirmation of the above phenomenon.

It should be observed that the non-color-forming reaction takes place with shorter exposures than the color-forming reaction at any wavelength to which the emulsion is sensitive. The fact that the two reactions can be initiated by a single monochromator beam is clear indication that light of a single wavelength band can be used for both the imaging and blanket development exposures in the positive-working mode of the NVC-CBr$_4$ system.

TABLE I

Formulation I:
- Gelatin _____ g__ 10
- Water _____ g__ 36
- N-vinylcarbazole _____ g__ 5
- CBr$_4$ _____ g__ 1
- Antifoam B _____ drops__ 6
- Formalin _____ drop__ 1

| Monochromator Exposure, Seconds | Wavelength Setting, Millimicrons | | | | | |
|---|---|---|---|---|---|---|
| | 400 | 450 | 500 | 550 | 600 | 650 |
| 2 | Non-color | | | | | |
| 3 | Color | Non-color | | | | |
| 5 | Color | Color | | | | |
| 15 | Color | Color | | | | |
| 30 | Color | Color | Non-color | | | |
| 45 | Color | Color | Non-color | | | |
| 50 | Color | Color | Non-color | | | |
| 60 | Color | Color | Non-color | | | |
| 70 | | | | Non-color | | |
| 80 | | | | Non-color | | |
| 120 | | | | Color | | |
| 150 | | | | Color | | |

Legend:
N-C or non-color = non-color-forming reaction.
C or Color = color-forming reaction.
_____ = no reaction.
(Blank Space) = not tested.

TABLE II

Formulation II: Added 1.3 mg. of Orthochrome T to control formulation I of Table I

| Monochromator Exposure, Seconds | Wavelength Setting, Millimicrons | | | | | |
|---|---|---|---|---|---|---|
| | 400 | 450 | 500 | 550 | 600 | 650 |
| 2 | Non-color | | | | | |
| 3 | Non-color | Non-color | Non-color | Non-color | | |
| 5 | Non-color | Non-color | Non-color | Non-color | Non-color | Non-color |
| 15 | Non-color | Non-color | Non-color | Non-color | Non-color | Non-color |
| 30 | Color | Color | Color | Color | Color | Non-color |
| 45 | Color | Color | Color | Color | Color | Non-color |
| 60 | Color | Color | Color | Color | Color | Color |

See legend at end of Table I.

TABLE III

Formulation III:
- Gelatin _____ g__ 10
- Water _____ g__ 36
- Mix A _____ g__ 5
- CBr$_4$ _____ g__ 1
- Antifoam B _____ drops__ 6
- Formalin _____ drop__ 1

Mix A—2 mg. of Rhodamine B and 5 g. NVC were premixed by first melting NVC and adding the dye to it.

| Monochromator Exposure, Seconds | Wavelength Setting, Millimicrons | | | | | |
|---|---|---|---|---|---|---|
| | 400 | 450 | 500 | 550 | 600 | 650 |
| 2 | Non-color | | | | | |
| 3 | Color | | | Non-color | Non-color | |
| 5 | Color | Non-color | | Color | Color | |
| 15 | Color | Color | Non-color | Color | Color | |
| 30 | Color | Color | Color | Color | Color | |
| 45 | Color | Color | Color | Color | Color | |
| 60 | Color | Color | Color | Color | Color | |

See Legend at end of Table I.

In the foregoing results, the initial photoreaction occuring with variations in exposure time and wavelength setting are given for a few N-vinylcarbazole CBr$_4$ emulsions. The initial photoreaction may be a color-forming reaction which is completed simply by heating the emulsion after the exposure. If the initial reaction is non-color-forming then visual density is not produced by heating. By causing the background area to develop color with a blanket UV exposure and heat, the original area in which the non-color-forming reaction took place can be seen as a light area against the darker background.

These results show that in the spectral region in which an emulsion is sensitive, both the non-color-forming and color-forming reactions can be initiated by the same wavelength band of light from the monochromator. The factor which determines which of the two reactions is to take place is the degree or extent of the light exposure. The non-color-forming reaction takes place with shorter source exposures.

Thus, a positive-working process is possible with these emulsions using a short initial exposure to form an image with a given light source, followed by a longer or greater exposure with the same light source and heat to develop color in the previously unexposed areas.

Also, a negative-working process is possible with these emulsions using light of the same wavelength band for both imaging and fixing, using an imaging exposure with a given light source followed by heat to produce the image, then a shorter exposure to the same light source to color-deactivate the previously unexposed areas.

In the following Examples 4 through 8, light of a predetermined wavelength band (either from a monochromator or a tungsten light through a Corning CS3–70 yellow filter) is used for both the imagng and develoment exposures.

EXAMPLE 4

A Rhodamine B-sensitized sheet was used for this experiment and was prepared according to the following formulation:

| | | |
|---|---|---|
| Gelatin | g__ | 10 |
| Water | g__ | 36 |
| Mix A[1] | g__ | 5 |
| CBr$_4$ | g__ | 1 |
| Dow Corning Antifoam B | drops__ | 6 |
| Formalin | drop__ | 1 |

[1] Mix A: Two (2) mg. of Rhodamine B and 5 g. of N-vinylcarbazole were premixed by first melting the NVC and adding the dye to the melt.

The coating was applied on vellum.

A coated sheet was exposed to an 8-diameter Kodachrome projection from a Bell and Howell 300 W. Headliner projector for 10 seconds. The projection was made through a Corning CS3–70 yellow filter which transmits in the green and red regions of the spectrum, cutting out all UV and practically all of the blue.

The exposed sheet was warmed slightly with an electric hair dryer for about 10 seconds then given a blanket exposure with the same projector, with the Kodachrome slide removed, through the same CS3–70 filter for 30 seconds. Upon heating, a positive picture was produced which was a monochromatic copy of the original Kodachrome transparency.

EXAMPLE 5

An Orthochrome T-sensitized emulsion was prepared according to the following formulation and coated on vellum:

| | | |
|---|---|---|
| Gelatin | g__ | 10 |
| Water | ml__ | 36 |
| Mix B[1] | g__ | 5 |
| CBr$_4$ | g__ | 1 |
| Antifoam B | drops__ | 6 |

[1] Mix B: Two (2) mg. of Orthochrome T and 5 g. of NVC were premixed by melting the NVC and adding the dye.

The coated sheet was exposed and processed according to the procedure given in Example 4. A positive picture was obtained.

EXAMPLE 6

A non-dye-sensitized NVC–CTB coated sheet portion (1) prepared according to Example 5 was exposed for 5 seconds to a square beam from Bausch and Lomb grating monochromator, using a tungsten light source and the wavelength setting at 450 m$\mu$. The exposed sheet portion (1) was warmed for about 5 seconds with an electric hair dryer then portion (3) was re-exposed to the same beam for 10 seconds. For the second exposure, the sheet portion (3) was shifted slightly so that the beam now exposed an area (3) which was not previously exposed as well as an area (2) which was previously exposed (as indicated on the following Sketch I):

SKETCH I

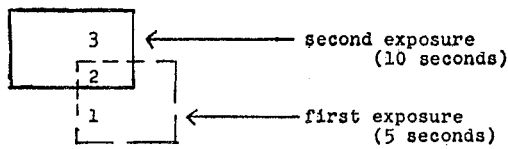

second exposure (10 seconds)

first exposure (5 seconds)

The foregoing exposed sheet portions (1), (2) and (3) are then heated. No color or very little color developed in the area (1) receiving only the first exposure and in the overlap area receiving two exposures (2), but color developed in area (3) (as indicated in Sketch II):

SKETCH II

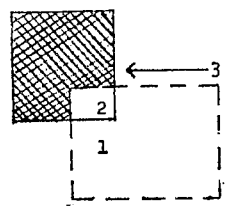

As indicated in the above Sketch II, color developed in the area receiving only the second exposure (3). The upper left corner (2) of the first exposed area (1) in the overlapped area was clearly defined.

This method of exposure with a monochromator beam is equivalent to the exposure procedure in making a positive picture. The overlap area (2), which is light, is the area which receives both the initial imaging and blanket development exposures and corresponds to the light areas in a positive picture. The dark area (3) corresponds to the dark or shade areas in a positive picture. The light area (1) corresponds to what constitutes a now non-photoresponsive area.

EXAMPLE 7

A vellum sheet was coated with the following formulation:

| | | |
|---|---|---|
| Gelatin | g__ | 10 |
| Water | ml__ | 36 |
| NVC | g__ | 5 |
| CBr$_4$ | g__ | 1 |
| Pinacyanole | mg__ | 0.64 |
| Antifoam B | drops__ | 6 |

The sheet was exposed to a Kadochrome projection from a Bell and Howell Headliner projector through a Corning CS3–70 yellow filter for one minute; warmed; given a blanket exposure with the same projector with the slide removed through the same CS3–70 filter for 5 minutes and heated. A positive picture was obtained which was a monochromatic copy of the original Kodachrome transparency.

EXAMPLE 8

The coating in Example 7 was repeated with Capri blue (0.58 mg.) replacing pinacyanole in the formulation. The sheet was exposed to a Kodachrome projection from a Bell and Howell Headliner projector through a Corning CS3–70 yellow filter for 2 minutes; warmed, given a blanket exposure with the same projector with the slide removed through the same CS3–70 filter for 8 minutes and heated. A positive picture was obtained.

Examples 7 and 8 show that even with relatively slow emulsions which require long first and second exposures, the process for making positive pictures still works.

EXAMPLE 9

A reflex exposure was made with the Rhodamine B-sensitized sheet such as that of Example 4. The sheet was exposed in front of an original, the emulsion side away from the light, in a Verifax Regent Copier for two seconds. The sheet was warmed then exposed with the emulsion facing the light, with the original removed, for five seconds. The sheet was heated to develop a (wrong-reading) positive image.

EXAMPLE 10

The procedure of Example 9 was repeated except this time the first exposure was made with the emulsion facing the light or away from the original and with a blank sheet of paper placed in front of the emulsion. After warming, the blank sheet of paper and the original were removed and the emulsion exposed to direct light from the lamps for five seconds. The sheet upon heating developed a direct-reading positive image.

In the process for making a positive image with the same light source for both the imaging and development exposures, the imaging exposure is short and the development exposure is longer.

The imaging exposure needed to obtain adequate deactivation of the coating to prevent or inhibit color formation by the subsequent development exposure and heat and the development exposure needed to develop a satisfactory or usable visual image density will vary with the intensity and wavelength band of light used and the sensitivity of the emulsion. One cannot specify the exposure to be used without at the same time specifying the wavelength band of light and the emulsion to be used. On the other hand, a ratio of the second blanket exposure to the first imaging exposure for a given light source can be given which will in a general way apply to most emulsions and wavelengths of light.

This ratio was determined for a Rhodamine-sensitized emulsion such as described in Example 4 and for a non-sensitized NVC–$CBr_4$ emulsion such as described in Example 4 but without the Rhodamine B. For the Rhodamine-sensitized emulsion the 550 m. monochromator beam was used for making the exposures while for the non-sensitized NVC–$CBr_4$ emulsion, the 450 m$\mu$ beam was used.

EXAMPLE 11

Two overlapping exposures were made successively on each test sample according to the procedure described in Example 6, each of the exposures being varied to give different ratios of the two exposures. The first (non-color-forming) exposure was for 3, 4 or 5 seconds (Sketches A, B and C, respectively) while the second (color-forming) exposure ranged from 5 to 15 seconds, in the corresponding Sketches indicated below:

SKETCHES

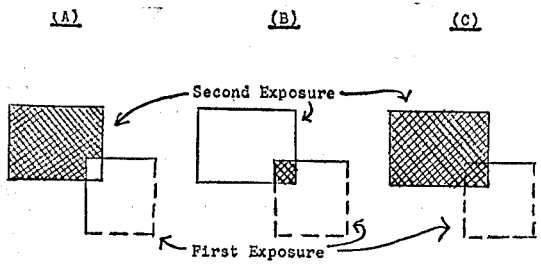

In Sketch (A) both the initial deactivating exposure and the color-forming exposure were adequate. The upper left corner of the first exposure is clearly defined and the lower right corner of the second exposure is not or is barely visible.

In Sketch (B) both initial and color-forming exposures were inadequate. The overlap area is very slightly darker than the other areas.

In Sketch (C) the initial exposure was inadequate while the color-forming exposure was adequate. Color formation in the overlap area is not sufficiently inhibited although the color is not as strong as in the area receiving only the second exposure. The lower right corner of the second exposure is clearly defined while the upper left corner of the first exposure is fuzzy.

Color density increases with exposure from the minimum exposure which gives usable or acceptable color density to the exposure which gives the maximum possible density with the emulsion used. The non-color-forming first exposure increases inhibition to color formation with increasing length of exposure, but soon reaches an optimum because lengthening the exposure further results in color formation.

The ratio of the two (second to first) exposures is minimum when the color-forming second exposure gives the minimum usable image density and the first exposure is that which gives maximum color deactivation. The ratio is maximum when the second exposure gives the maximum possible density and the first exposure is again that which gives maximum color deactivation.

This optimum exposure for color-deactivation was about 5 seconds for Rhodamine B-sensitized emulsion under our experimental conditions. A 6-second exposure, followed by heating, produced an acceptable color density; therefore, the minimum ratio of the two exposures for 6/5 for this particular emulsion. After a 5-second initial exposure, a second exposure for 50 seconds (10/1 ratio) and 75 seconds (15/1 ratio) produced little color in the overlap area, indicating strong deactivation. The 15/1 ratio was the maximum tried.

An initial exposure for 5 seconds was found to be also right for the non-sensitized NVC—$CBr_4$ emulsion and the minimum and maximum ratios for the two exposures were the same as those for the Rhodamine B-sensitized emulsion. (That five seconds should be optimum initial exposure for both emulsions is coincidental since the emulsions were exposed to different wavelengths and, therefore, to different intensities of light.)

The ratio of the two exposures in the case where a monochromator is used is the ratio of the respective exposure times since the beam intensity is the same for the two exposures. The ratio of the exposures when a slide projector is used is not the ratio of the exposure times since the slide is removed for the second exposure and the intensity of the projected beam is greater. It is possible, therefore, to use a given exposure time for the imaging exposure, then to use a shorter exposure time for the blanket exposure with the slide removed.

The photoreaction initiated by the first brief exposure is a continuing reaction which goes on even after the light is turned off. For maximum deactivation it is desirable to allow this reaction to go its full extent. In these examples, deactivation appears to be maximum when the exposed emulsion is allowed to stand at room temperature in the dark for 10 minutes or longer, although deactivation is noticeable even after one minute standing.

For intervals shorter than one minute between the two exposures, the sheet is warmed (temperature less than 160° F.) after the initial exposure.

As noted, the starting agents $a$ and $b$ are dispersed in the continuous phase $c$ in the form of fine discrete globules or particles which dispersion allows an intimacy of molecular association. Essentially the problem of control of particle size, photosensitivity, intimacy of molecular association, etc. in the dispersed phase combination $ab$ is effected to the greatest advantage in the practice of the instant invention by using a continuous phase $c$ in which the individual agents $a$ and $b$ as well as their combination $ab$ are substantially insoluble and, in view of the generally hydrophobic character of such agents, it has been found that aqueous continuous phase systems are distinctly superior for most purposes in the practice of the instant invention. The invention is, however, not necessarily limited to the use of an aqueous continuous phase $c$. Since an important aspect involves the formation of a discrete and distinct dispersed phase, in the initial emulsion, it is important that the continuous phase selected be one in which the dispersed phase components, or at least the final dispersed phase elements (if some solvents might be used to effect initial mixing or dispersion) are substantially insoluble for practical purposes.

Thus, commercially available substantially non-aqueous butylated urea-formaldehyde and butylated melamine-formaldehyde can be used, using, for example, a 15% solid butylated urea-formaldehyde or butylated melamine-formaldehyde resin in a 50—50 ethanol-butanol solvent system. Ethylated and methylated urea-formaldehyde resins may be used similarly in the practice of the invention.

The aqueous systems for use as the principal vehicle or medium in the continuous phase c, particularly in the case of aqueous protein (gelatin) systems, have been found to give the best results in the practice of the invention, and this is believed to be a result of unusual synergism with respect to the aqueous emulsion formation.

With respect to the selection of the halogen-containing compound preferred for use in the practice of the invention, it is appreciated that elaborate definitions of the halogen-containing compound undergoing the color forming reaction of the various aryl amines are set forth in the aforesaid Wainer patents (and halogen containing organic compounds meeting such definitions are used herein). The organic halogen starting agent is preferably selected from the group of compounds which produce free radicals or ions upon exposure to light of a suitable wavelenth and in which there is present at least one active halogen selected from the group consisting of chlorine, bromine, and iodine, attached to a carbon atom having not more than one hydrogen atom attached thereto. Such halogen compounds are generally more reactive and photosensitive than other organic halides, such as the corresponding fluorine compounds. Examples of such compounds include bromotrichloromethane, bromoform, iodoform, 2,2,2-tribromoethanol, 1,1,1-tribromo-2-methyl-2-propanol and, having particular effectiveness, carbon tetrabromide, tribromochloromethane, dibromodichloromethane, pentabromoethane, hexachloroethane and hexabromoethane.

Other examples can be found in the above mentioned patents to Wainer, Sprague, and Beebe, the disclosures of which are incorporated herein by reference. Among the halogen-containing compounds specifically mentioned by Wainer are carbon tetrabromide and hexachloroethane; both of which have been found to give superior performance in the practice of the instant invention. In addition, pentabromomethane has been found to perform in a satisfactory manner in the preparation of photosensitive films and materials in accordance with the practice of the instant invention. The other halogen compounds disclosed by Beebe, Wainer and Sprague may also be used.

In a particular embodiment of this invention, it is preferred to use organic halogen compounds which have the formula Br—C—(X)(X')(X")$_n$(CY$_3$)$_{1-n}$ where X, X' and X" are halogens, each Y is independently selected from a group consisting of halogens, hydrogen, hydroxy, methyl and methylol, and $n$ is selected from 0 and 1, such that when $n$ is 0, X and X' are Br. These compounds are preferred in certain uses of this invention where a dye sensitizer is added to extend the spectral range of photosensitivity of this emulsion. They are generally more readily dye-sensitized than other halogen compounds. Examples of such compounds include carbon tetrabromide, bromotrichloromethane, dibromodichloromethane, pentabromoethane, 2,2,2-tribromoethane and 1,1,1-tribromo-2-methyl-2-propanol.

As noted, both negative-working and positive-working photosensitive emulsions can be produced by means of this invention. In formulating positive-working emulsions, as already indicated, the aforementioned nitrogen atom-containing compound must be bifunctional; that is, it must be capable of undergoing two separate and distinct reactions on exposure to actinic light in the presence of the organic halogen compound. It is preferred that one such reaction result in deactivation of the compound toward a wavelength-intinsity-exposure of light which otherwise would result in the formation of a coloring agent. Thus, it is preferred to use a nitrogen atom-containing compound which is capable of responding to a second predetermined wavelength-intensity-exposure of light to form a coloring agent and is capable of responding to a first predetermined wavelength-intensity-exposure of light of deactivation such that it will remain substantially colorless when later subjected to said second predetermined wavelength-intensity-exposure of light. It is most preferred to use such a nitrogen-atom-containing compound in which the nitrogen atom is attached directly to a carbon atom of a vinyl group, i.e., an N-vinyl compound.

Furthermore, it has been found that the aromatic N-containing compound structure which is particularly useful in the practice of the instant invention has the general Formula I hereinafter set forth, wherein the dotted line indicates an incompletely shown heterocyclic ring structure, and the C=C indicates the vinyl group, which is understood to be capable of addition polymerization. In general, it is believed that the structure I is capable of color formation with a halogen-containing compound, wherein the halogen is bonded directly to a carbon atom (and preferably a plurality of halogens are bonded directly to a single carbon atom), so long as the instant compound I has not first undergone some other reaction. In addition, it is believed that particularly in the positive-working systems of the invention, there is some initial reaction possibly of the type involving addition polymerization which may be only far enough to form a dimer or trimer of the compound I, which may be sufficient to deactivate the same for purposes of the contemplated color forming reaction. In this way, the combination of N-vinylcarbazole and carbon tetrabromide is believed to become converted from a photosensitive combination by what compares to this initial type of photo-polymerization in response to the initial exposure (wherein the light areas of the original image effect initial photoreaction of the corresponding light struck areas of the film). The subsequent blanket exposure to ultraviolet light apparently serves to bring out the color reaction in the previously unexposed or non-light struck areas of the film and also to catalyze (possibly with the help of heat also used) the further polymerization type of deactivation of the areas originally exposed to actinic light.

In formulating negative-working emulsions, the selection of an aromatic N-containing compound as described above merely for its ability to form some sort of color with a halogen-containing compound under the influence of actinic light is a practical minimum for purposes of demonstrating the invention. In a preferred embodiment of the invention the starting materials selected are solids, mutually fusible at a temperature which does not result in complete desensitization of the combination, and most preferably mutually fusible or combinable in the manner hereinbefore described to obtain a normally solid photosensitive combination. On this basis, the invention may be demonstrated with respect to the ability to control many of the essential aspects of practical photographic compositions, films and products, in the manner hereinbefore described.

Prior art workers have indicated that organic halogen compounds react under the influence of light with aryl amines to produce color, preferably when the aryl group is attached directly (via a nuclear C atom) to the amine N atom, as in the case of diphenyl amine. Preferably, however, in the practice of the instant invention, the N-containing compound is an aromatic compound but it is one which has a heterocyclic N atom in a ring conjugated with one or more benzene rings (and in this particular structure it is preferable to have the heterocyclic N atom attached to a C atom in a benzene nucleus, and it is additionally preferable to have this C atom included within the heterocyclic ring structure as well as the benzene ring structure). In both the negative and positive-working systems of the invention, the heterocyclic N atom is also preferably attached directly to a C atom of a vinyl group. Accordingly, the N-vinyl indoles and carbazoles are of particular interest.

N-vinyl ring structures suitable for negative-working systems but especially adapted for positive working systems in the practice of the invention include the following various structures:

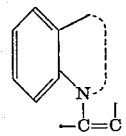
(I)

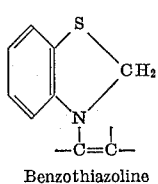
(II)
Benzothiazoline

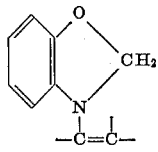
(III)
Benzoxazoline

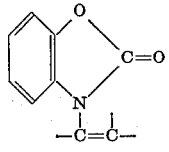
(IV)
Benzoxazolone

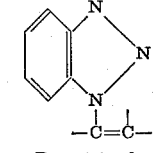
(V)
Benzotriazole

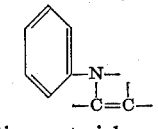
(VI)

Particularly effective materials useful as dispersing mediums include gelatin, casein, polyvinyl alcohol, gum arabic, starch, sodium carboxymethylcellulose and hydroxyethylcellulose.

In general, the weight ratios of the starting agents $a$ and $b$ may vary widely, from a minimum practical weight ratio of $a:b$ of about 1:5 to a maximum ratio of about 50:1. If the proportion of $b$, e.g. carbon tetrabromide, used is greater than that specified in the instant range, it is ordinarily found that no practical advantage is obtained, and, in general, the weight ratio of $a:b$ used is not below about 1:2, except in special situations wherein losses of $b$, e.g. carbon tetrabromide, are contemplated prior to the actual photosensitizing reaction. Also, if the amount of $b$ used is less than the minimum ratio just specified, the photosensitization of the combination $ab$ appears to be unnecessarily reduced.

Considering next the relative weights of the solids in the dispersed phase (1), i.e., ordinarily the combination $ab$, plus certain relatively small amounts of additional functioning components, compared to the solids (2) in the continuous phase $c$, it is found that the solids weight ratio of (1):(2) is preferably about 1:2, but may range from a maximum practical ratio of about 5:1 to a minimum practical ratio of about 1:50. The continuous phase $c$ may be 100% "solids" in the sense that the entire system solidifies without any loss of solvent, e.g., in the formation of aqueous gel type systems, but generally the solids to liquid ratio in the continuous phase $c$ is within the range of about 1:1 to about 1:30. The selection of the solids to liquid ratio for the continuous phase $c$ involves consideration of viscosity, thixotropic properties, and the like in order to obtain a desired system for the preferred emulsion formation. Also, this selection involves determination of the difference in viscosity of the continuous phase as compared with the viscosity of the molten dispersed phase at the emulsification temperature. This viscosity difference is determinative of the ultimate particle size to a considerable extent. Thus, the inclusion of relatively small amounts of a compatible plasticizer in the dispersed phase which may serve to materially depress the melting point of the dispersed phase components and which will be retained in the dispersed phase as a truly hydrophobic material (and thus aid in non-agglomeration), may result in very low viscosities in the dispersed phase at the operating temperatures, so as to obtain an extremely fine particle size. The particle sizes now obtained have been found to be within the range of approximately 0.3 to 25 microns and in preferred embodiments of the invention, 0.3 to 10 microns. Smaller particle sizes can be obtained by the use of various methods of depressing the viscosity of the dispersed phase without a corresponding depression of the viscosity of the continuous phase during the emulsification operation.

It has been brought out in this invention that compounds $a$ and $b$ should be dispersed together in a photosensitive coating as fine discrete particles rather than in molecular or near molecular form. The proximity of the reactants, due to the high reactant concentration in the particulate structure, is believed to be the reason for the great sensitivity of the particulate system.

In Example 1, compound $a$, N-vinylcarbazole in that case, is violently agitated in the dispersion medium $c$, e.g., aqueous gelatin solution, which is at a temperature above the melting point of compound $a$. Since compound $a$ is in the molten state, agitation produces an emulsion, i.e., a liquid-in-liquid dispersion. Compound $b$, $CBr_4$ in that case, is added to the emulsion with continued agitation, and the resultant emulsion is applied to a sheet support. Upon cooling and drying, a photosensitive coating is obtained in which fine discrete $ab$ particles are dispersed in a solid dispersion medium $c$.

It is also possible, and it is preferable, to obtain an emulsion by a process in which compound $a$, instead of being melted, is first dissolved in an organic solvent to liquefy the same, and the solution is then emulsified in an aqueous solution of gelatin or some other water-soluble binder. Compound $b$ may be in the same organic solvent solution with compound $a$ so that both reactants are dispersed together, or compound $b$ may be added later, in a separate solution, to be already formed emulsion with the dispersed phase $c$ containing compound $a$. Emulsions prepared by this solution process, when applied to a sheet support and dried, give the same type of photosensitive coatings obtained by the previously disclosed molten compound $a$ process.

Compounds $a$ and $b$ form an intimate combination $ab$ as the solvent is lost from the dispersed phase. Because lower temperatures are used in such emulsion preparation, premature reaction between the reactants and the loss of reactant(s) by volatilization are minimized. Also, the choice of compound $a$ is not limited to those compounds which melt below the boiling point of the dispersion medium. Furthermore, batch preparations of photosensitive emulsions are more easily handled by the solution process.

Another advantage in using a solvent is that the amount of agitation needed to disperse the compounds, when so liquefied, can be substantially reduced. Thus, the use of even simple stirring will generally suffice to yield a useful emulsion. However, particle sizes are generally larger when agitation is curtailed, and therefore the grain size of the resultant film is larger. Accordingly, even when a solvent is used, it is preferred to use "violent" agitation such as has been described. In this way, emulsions containing very fine particles, e.g., 0.3–10.0 microns, can be readily obtained.

While an organic solvent is used in putting the compounds into dispersion, the whole system is essentially an aqueous system. The amount of organic solvent used is relatively small.

PROCEDURE A

In this procedure, the compounds a and b are added separately to the binder solution. Compound a, in an organic solvent solution, is first dispersed in the binder solutions, preferably with the aid of a dispersant (surfactant), preferably using high shear agitation. Agitation is continued until a uniform dispersion (emulsion) is formed with the dispersed droplets mainly in the 0.5 to 20μ range (e.g., about 5 minutes). Compound b, in a separate solution, is added to the above prepared emulsion and agitated until a uniform emulsion is obtained once more.

Handling of compound b, such as when preparing a solution or adding the solution to the compound a emulsion, is carried out under safe light. The preparation of the N-compound emulsion can be carried out under ordinary room light.

High shear agitation can be obtained by using a Lightnin mixer at 1000–2500 and higher r.p.m., preferably at about 1700 r.p.m., with a special stirrer which is a circular metal disc perforated with small circular holes. With this equipment, liquid mixtures can be agitated without vortexing, which tends to form air bubbles in emulsions.

The solvent used for compound a and compound b may be the same, but need not be the same. For example, N-vinylcarbazole is less soluble in methanol and isopropanol than in acetone or benzene so that these alcohols are less effective in dispersing N-vinylcarbazole. However, $CBr_4$ is very soluble in methanol and isopropanol and either may be used as solvent for the $CBr_4$.

PROCEDURE B

In this procedure, both compounds a and b are dissolved together in the same organic solvent. The solution is then added to the binder solution to form the emulsion, preferably with high shear agitation. A dispersant may be used to aid in forming the emulsion.

The formation of particles in the photosensitive coating proceeds in two stages: (1) the formation of a liquid-in-liquid dispersion (emulsion) with the ab solution as the dispersed phase, and (2) the solidification of the ab from the dispersed solution c.

The general process of emulsification can use well developed techniques such as is found in J. J. Bikerman, Ind. and Eng. Chem. 57, 59 (1965), the disclosures of which are incorporated herein by reference.

In order to reach a supersaturated condition in the compound a solution or the ab solution soon after dispersing it in an emulsion, a highly concentrated solution must be used. This means that a good solvent for compound a must be used. Also, there is an upper limit to the relative amount of solvent which can be used to obtain a satisfactory coating.

Usable solvents include ketones, cyclic ethers, esters, aromatic hydrocarbons, and chlorinated hydrocarbons. Examples of suitable solvents include: acetone, tetrahydrofuran, p-dioxane, methyl ethyl ketone, ethyl acetate, n-butyl acetate, dimethyl formamide, isoamyl acetate, benzene, p-xylene, toluene, dimethylsulfoxide, chloroform, carbon tetrachloride, methanol, ethanol, isopropanol, ether, ligroin and petroleum ether.

The choice of solvent wil depend upon the particular photosystem to be dispersed, particularly the N-compound, and the binder used in the dispersion medium.

Surprisingly, the water-miscibility of a solvent is not a major factor in determining its suitability. Satisfactory coatings have been made with acetone (water-miscible), ethyl acetate (partially-miscible) and toluene (water-immiscible).

It will be appreciated that the acetone, for example, may facilitate dispersioner distribution of the carbon tetrabromide in the emulsion initially, but the acetone is a "coupler" or type of mutual solvent between the dispersed phase and continuous phase and it will thus tend to obscure somewhat the clearcut distinction between the dispersed and continuous phase and the emulsion system generally. If substantial amounts of acetone are retained in the dispersed phase, it will be found that there may be impairment of the desired non-agglomeration thereof during solidification, and there may be some subtraction from the generally intrinsic colloid character of the system. In certain instances, controlled agglomeration may be desirable; but in most instances in the practice of the instant invention this is not the case and it is generally preferable to reduce the acetone or similar dispersed phase solvent to an insignificant or non-functioning proportion (by adjustment of the total water content, if complete removal from the system is not feasible under the time-heat conditions). In such instances, the relatively nominal or insignificant amount of such solvent remaining in the dispersed phase combinations a and b does not qualify as one of the starting agents that is understood to undergo photochemical color forming reactions, or that is involved in any chemical combination of such agents. The same is true, of course, in the case of the use of toluene, various low boiling alcohols, ethers, xylene, etc. which may be useful in initially dispersing the dispersed phase agents in the emulison, and which may even function as transitory or temporary plasticizers to depress the fusion temperature or melting points of the individual ingredients a or b, to assist their fusion together at temperatures lower than the melting point of either.

It will thus be seen that using such small amounts of solvents, and particularly using hydrophobic or substantially water-insoluble solvents of this type, such as toluene and xylene, it is apparently possible to obtain depressed melting points or fusion temperatures for these particular active ingredients a and b so as to permit the mutual fusion thereof in the dispersed phase of the emulsion, e.g. during violent agitation in the Waring blender, at temperatures less than the previously mentioned temperature of 70–72° C. and less than the melting point of either of these materials, e.g., for N-vinylcarbazole and $CBr_4$, at temperatures in the neighborhood of about 45° C. During such agitation the solvent will be withdrawn from the dispersed phase so that the melting point or solidification temperature of the homogeneous dispersed phase system may rise until solidification thereof takes place in situ without the necessity of first cooling the emulsion, and, of course, without the necessity for initially heating the emulsion to the higher temperatures previously mentioned. An advantage in this latter respect is that in the case of certain highly reactive agents a and b temperature control during the combination thereof is found to be very important in avoiding premature and/or undesirable reactions therebetween. The instant invention thus affords an additional method of controlling the manner in which combinations ab may be obtained.

In this respect, however, there are certain significant aspects of the invention involving the use of a solvent for, in or with the dispersed phase. For example, if a film is formed of the continuous phase in substantially immobile, dry to the touch condition, with encapsulated globules of dilute solutions of solvent containing a and b, using a solvent which will volatilize in any reasonable storage period, then the net result will be a continuing loss of solvent from each encapsulated "chamber" thereof in the solid film, unless additional precautions are taken in forming the encapsulating film, and even then the storage characteristics of the film are impaired, e.g., because the film lacks compression strength because of these chambers. The lack of overall stability in the film (by virtue of the continuing loss of such solvent during storage) is in and of itself not preferred. Moreover, the loss of any significant amount of solvent in this manner during storage may tend to subtract from the molecular intimacy between the agents $a$ and $b$ which is apparently optimized by mutual fusion thereof (with or without nominal amounts of solvent). Thus, as a general rule, the substantial retention of the solidified particle shape and size and general "compression" strength characteristics, during at least a reasonable storage period for the dried film, is a measure as to whether or not an unnecessary or even undesirable excessive amount of solvent had been retained in the dispersed phase at the time of solidification.

As indicated, the mutual fusion of agents $a$ and $b$ is highly desirable, even if such mutual fusion is accomplished by a heat or energy input to a system containing a dispersed phase solvent to such an extent that solvent removal during the emulsion condition may result in a transition through the phases of solution of the agents in the solvent, to plasticization by the solvent retained in the body of the agents having depressed melting points by virtue of such plasticization, thereby affording or permitting mutual fusion of the agents at less than the true melting point of either, followed by still another change in condition whereby through cooling and/or still additional solvent removal the mutually fused agent combination $ab$ solidifies. In such a sequence it is thus possible to effect both mutual fusion and solidification at substantially no temperature change. In the preferred sequence, however, the desired molecular intimacy of the combination $ab$ is obtained by heating to fuse in situ, followed by cooling to solidify in situ (although the industrial practicalities of the use of the invention recognize that in large batches, for ease of mixing and to avoid localized "hot spots" or premature or excessive chemical reaction between the ingredients, either of the agents $a$ or $b$ may be dispersed in a suitable solvent or volatile carrier before being blended into the emulsion).

It must be appreciated, however, that the concept of mutual fusion differs from mere mutual solution of the agents $a$ and $b$ in a substantial amount of solvent $s$, e.g. weight ratios of $s:ab$ ranging from about 1:1 and up in the dispersed phase. It is conceivable that in the case of the highly reactive combination, for example, of $a$ N-vinylcarbazole and $b$ carbon tetrabromide, the desired photosensitive combination can be formed in the presence of larger amounts of solvent $s$ or other diluents in the dispersed phase, but in the case of less highly reactive combinations of $a$ and $b$ this is not believed to be the case. Such less reactive agents may remain in a solution of excessive solvent ultimately encapsulated in a film or, alternatively, if the solvent is withdrawn rapidly from the dispersed phase, they may precipitate mutually or sequentially from a given starting excess of solvent or other diluent at temperatures which are insufficient to effect mutual fusion and the resulting mixture will be lacking in the optimum photosensitivity of the invention. Also, excessive amounts of solvent initially in the dispersed phase may overly depress the emulsion temperature during agitation so that certain less reactive agents $a$ and $b$ will merely precipitate rather than fuse together even though the solvent may be substantially or significantly withdrawn from the dispersed phase during violent agitation.

The undesirable result obtained by inadequate formation of the combination $ab$ is apparent from tests establishing the photosensitivity thereof. In general, desirable results (and, therefore, presumably desirably mutual fusion) are obtained if the weight ratio of $s:ab$ is below about 1:2, and preferably 1:4.

A dispersant (surfactant) can be used to reduce the interfacial tension between the compound $a$ solution or the $ab$ solution and the aqueous dispersion medium to help in forming dispersed droplets of fine particle size. Together with the colloid in the dispersion medium, the dispersant stabilizes the emulsion, i.e., prevent the coalescence of the dispersed droplets. The dispersant also plays a part in the wetting of the emulsion on paper or other sheet supports.

Cationic, non-ionic and anionic dispersants can be used. The anionics such as sodium dioctylsulfosuccinate and sodium tetradecylsulfate are generally the most suitable.

After the compound $a$ or $ab$ in solution is dispersed as fine droplets, the loss of solvent from the droplets by diffusion into the aqueous phase, the decrease in the solvent capacity of the solvent in the dispersed droplets by dilution with water diffusing in from the aqueous phase, cooling, etc., are factors which cause the dispersed solution to reach a supersaturated condition, causing solidification. Solidification takes place suddenly and all at once in the total volume of the droplet. Some of the solvent probably remains with the solid. When the particle formed is larger than the original droplet, a very grainy coating results. Larger particles come from unstable emulsions, where the dispersed droplets coalesce or cluster. Smoother coatings can be obtained by making one or more of these changes: (1) increasing the binder concentration, (2) changing to a more effective dispersant, (3) changing to a less water-miscible solvent.

The following table gives the solubility in weight percent of N-vinylcarbazole (NVC) in several of the more important organic solvents. The figures were arrived at by weighing a saturated solution of NVC in the individual solvents, then evaporating the solvents off and weighing the residues.

| Solvent: | Solubility of NVC (weight percent) |
|---|---|
| Acetone | 46 |
| Tetrahydrofuran | 70 |
| p-Dioxane | 67 |
| Methyl ethyl ketone | 57 |
| Ethyl acetate | 33 |
| Isoamyl acetate | 52 |
| Benzene | 53 |
| Toluene | 60 |
| p-Xylene | 48 |
| Dimethyl sulfoxide | (1) |
| Chloroform | 57 |
| Carbon tetrachloride | 47 |
| Methanol | 5 |
| Ether | 47 |
| Ligroin | 12 |
| Petroleum ether | 10 |

[1] Vapor pressure of solvent too low to evaporate in a reasonable time, but NVC was substantially soluble.

Emulsion preparation using Procedure A

EXAMPLE 12

| | | |
|---|---|---|
| (a) Gelatin solution (10%) | ml | 50 |
| Dow Corning Antifoam B | drops | 6 |
| Tergitol Anionic 4 | cc | 0.1 |

Tergitol Anionic 4 (sodium tetradecylsulfate, a dispersant) and Dow Corning Antifoam B were mixed into the gelatin solution, maintained at 105 to 110° F., with high shear stirring. To this gelatin solution, an NVC solution was added slowly while continuing the agitation. The solution was made up as follows:

| | | |
|---|---|---|
| (b) N-vinylcarbazole (NVC) | g | 2.5 |
| 4-(p-dimethylaminostyryl)-quinoline [1] | g | 0.002 |
| Acetone | ml | 1.5 |

[1] Optical sensitizer.

After all of the NVC solution was added, agitation was continued for about 5 minutes until a fine emulsion was obtained. All operations up to here were carried out in room light. While still continuing the agitation, a $CBr_4$ solution (in acetone) was added slowly to the above emulsion, under red safe light. The formulation of the $CBr_4$ solution (prepared under red light) was as follows:

| | | |
|---|---|---|
| (c) Carbon tetrabromide | g | 0.75 |
| Acetone | ml | 1.0 |

The resultant emulsion was coated on baryta-coated paper with a Bird blade applicator, 3-mil. wet thickness, and dried in a forced draft oven at 25° C.

A strip of the coated paper was exposed for 8 seconds to an 8-diameter projection image (Kodachrome slide) from a Bell and Howell 300 w. Headliner slide projector. The exposed strip was then warmed with an electric heat gun, given a blanket exposure to light from a 275 w. G.E. RS sunlamp for 2 seconds, then heated with a heat gun. A good direct-positive image was obtained.

EXAMPLE 13

Example 12 was repeated with the same volume of methyl ethyl ketone being used in place of acetone to make up the NVC solution and the $CBr_4$ solution.

A dry strip of the coated sheet, exposed and processed in the manner described in Example 12, gave a good direct-positive print.

EXAMPLE 14

Example 12 was repeated with the same volume of benzene used in place of acetone to make up the NVC solution and the $CBr_4$ solution.

A dry strip of the coated sheet, exposed and processed in the manner described in Example 12, gave a good direct-positive print.

EXAMPLE 15

Emulsion preparation using Procedure B

| | Ml. |
|---|---|
| (a) Gelatin solution (10%) | 50 |
| Aerosol OT (75%) | 0.1 |

The dispersant, Aerosol OT (sodium dioctylsulfosuccinate) was mixed with the gelatin solution with high shear agitation.

A solution containing NVC, $CBr_4$, and an optical sensitizer was added to the gelatin solution. Agitation was continued until a uniform fine dispersion was obtained.

(b) Formulation for NVC-$CBr_4$-sensitizer solution

| | | |
|---|---|---|
| N-vinylcarbazole | g | 2.5 |
| Ethyl acetate | ml | 2.5 |
| 4-(p-dimethylaminostyryl)-quinoline | g | 0.002 |
| Carbon tetrabromide | g | 0.75 |

The gelatin solution was kept at 105 to 110° F. during the preparation of the emulsion. The emulsion was coated on baryta paper with a Bird blade applicator, 3-mil. wet thickness, and dried in a forced draft oven at 25° C. A smooth coating on paper was obtained.

A strip of the coated paper was exposed to an 8-diameter projection image (Kodachrome slide) from a Bell and Howell 300 w. Headliner slide projector for 15 seconds. The exposed sheet was heated to develop out a good negative image.

Another strip of the same coated paper was exposed to the same projection image for 4 seconds. The exposed strip was warmed with an electric heat gun, given blanket exposure to a 275 w. G.E. RS sunlamp for 2 seconds, then heated with a heat gun to develop out a good direct-positive image.

EXAMPLE 16

A series of common organic liquids were used as solvents for NVC and $CBr_4$ in preparing the emulsion. Emulsions were prepared using Procedure B. NVC, $CBr_4$ and an optical sensitizer were dissolved together in each test solvent. Each of these solutions was then dispersed in an aqueous gelatin solution with the aid of sodium dioctylsulfosuccinate (dispersant), coated on baryta paper, dried, and tested for photosensitivity.

| | Ml. |
|---|---|
| (a) Gelatin solution (10%) | 50 |
| Aerosol OT (75%) | 0.1 |

The above solution was prepared with high shear agitation and with the gelatin solution at 105 to 110° F. Isopropanol, applied in short sprays from an atomizer, was used to destroy any foam.

Each NVC-$CBr_4$-sensitizer solution was made up as follows:

| | | |
|---|---|---|
| (b) N-vinylcarbazole | g | 2.5 |
| 4-(p-dimethylaminostyryl)-quinoline | g | 0.002 |
| Carbon tetrabromide | g | 0.75 |
| Test organic solvent | ml | 1.5 |

The NVC-$CBr_4$-sensitizer solution was added to the gelatin solution with agitation. Agitation was continued until a uniform dispersion was obtained. The prepared emulsion was applied to baryta paper with a Bird blade applicator which gave 3-mil. wet thickness.

(A) Negative image: The procedure described in Example 15 was followed to produce a negative image on a strip from each of the coated emulsions.

(B) Positive image: The procedure described in Example 15 was followed to produce a positive image on a strip from each of the coated emulsions.

The results obtained with the various emulsions (identified by the solvent used in making the emulsion) are given in Table IV:

TABLE IV.—EXPOSURE RESULTS

| Solvent | Negative Image (A) | Positive Image (B) |
|---|---|---|
| Acetone | Good | Good. |
| Tetrahydrofuran | do | Do. |
| p-Dioxane | do | Do. |
| Methyl ethyl ketone | do | Do. |
| Ethyl acetate | do | Do. |
| n-Butyl acetate | do | Do. |
| Isoamyl acetate | Fair (green-brown) | Fair (green-brown). |
| Benzene | Good | Good. |
| p-Xylene | Weak (brown) | Fair (brown). |
| Toluene | Fair | Fair. |

Quality Sequence: Good>Fair>Weak>Faint.
Color of Image: Blue, unless otherwise indicated.

EXAMPLE 17

This example is a repeat of Example 16, with the exception that the preparation of each emulsion was carried out with the temperature of the gelatin solution at 85° F. The results are summarized in Table V. The emulsions are identified by the solvents used in preparing them.

TABLE V.—EXPOSURE RESULTS
[Emulsions prepared at 85° F.]

| Solvent | Negative Image (A) | Positive Image (B) |
|---|---|---|
| Acetone | Good | Good. |
| Tetrahydrofuran | do | Do. |
| p-Dioxane | do | Do. |
| Methyl ethyl ketone | do | Do. |
| Ethyl acetate | do | Do. |
| n-Butyl acetate | do | Do. |
| Isoamyl acetate | Fair (brown-green) | Good (brown-green). |
| Benzene | Good | Good. |
| p-Xylene | Weak (brown) | Faint (brown). |
| Toluene | Fair | Fair. |

Quality Sequence: Good>Fair>Weak>Faint.
Color of Image: Blue, unless otherwise indicated.

EXAMPLE 18

This example is a repeat of Example 16, with the exception that the preparation of each emulsion was carried out with the temperature of the gelatin solution at 130° F. The results are summarized in Table VI. The emulsions are identified by the solvents used in dispersing the NVC and CBr$_4$.

TABLE VI.—EXPOSURE RESULTS

[Emulsions prepared at 130° F.]

| Solvent | Negative Image (A) | Positive Image (B) |
|---|---|---|
| Acetone | Good | Good. |
| Tetrahydrofuran | do | Do. |
| p-Dioxane | do | Do. |
| Methyl ethyl ketone | do | Do. |
| Ethyl acetate | do | Do. |
| n-Butyl acetate | do | Do. |
| Isoamyl acetate | Fair (green-brown) | Fair (brown-green). |
| Benzene | Good | Good. |
| p-Xylene | Faint (brown) | Faint (brown). |
| Toluene | Weak (brown) | Weak (brown). |

Image Quality Sequence: Good>Fair>Weak>Faint.
Color of Image: Blue, unless otherwise indicated.

EXAMPLE 19

The procedure in Example 16 was repeated with 1.5 ml. of the following solvents: dimethylsulfoxide, chloroform and carbon tetrachloride. The exposure results are summarized in Table VII. The emulsions are identified by the solvent used in dispersing the NVC and CBr$_4$.

TABLE VII.—EXPOSURE RESULTS

| Solvent | Negative Image (A) | Positive Image (B) |
|---|---|---|
| Dimethylsulfoxide | Good | Good. |
| Chloroform | do | Do. |
| Carbon tetrachloride | do | Do. |

Color of Image: Blue.

EXAMPLE 20

A solution was prepared containing 17 g. of gelatin in 100 ml. of solution. Using high shear agitation, 0.32 ml. of a sodium dioctylsulfosuccinate solution (37.5% Aerosol OT in isopropanol) was added to the gelatin solution.

A separate solution was prepared according to the following formulation:

| | |
|---|---|
| N-vinylcarbazole g | 4.2 |
| 4-(p-dimethylaminostyryl)-quinoline g | 0.0034 |
| Ethyl acetate ml | 2.5 |
| Carbon tetrabromide g | 3.4 |

This solution was stirred into the above gelatin solution and agitated until a uniform dispersion was obtained. The gelatin solution was maintained at 105 to 110° F. during the emulsion preparation. The resultant emulsion was coated on baryta paper and dried at room temperature.

An 8 x 10" direct-positive enlargement was made on a sheet of this smoothly coated paper. Exposure was for 45 seconds with a Simmon Omega enlarger. The original was a 2¼" x 3¼" black-and-white positive image transparency. The exposed sheet was warmed, given a blanket exposure to a 275 w. G.E. RS sunlamp, then heated with a heat gun to develop out a positive image.

EXAMPLES 21–24

Procedure B, in which both reactants are dissolved in the same solution, was chosen to prepare these emulsions. The procedure followed is that described in Example 15.

A gelatin solution for preparing each emulsion was made up as follows:

| | Ml. |
|---|---|
| Gelatin solution (10%) | 50 |
| Aerosol OT solution (37.5%) | 0.2 |

The temperature of the gelatin solution was 105 to 110° F.

A compound $a$ and compound $b$ solution as follows was emulsified in above gelatin solution.

Example 21:

| | |
|---|---|
| N-ethylcarbazole g | 2.5 |
| Carbon tetrabromide g | 0.75 |
| Ethyl acetate ml | 1.5 |

Example 22:

| | |
|---|---|
| Indole g | 2.5 |
| Carbon tetrabromide g | 0.75 |
| Ethyl acetate ml | 1.5 |

Example 23:

| | |
|---|---|
| N-vinylcarbazole g | 2.5 |
| Hexachloroethane g | 0.75 |
| Ethyl acetate ml | 1.5 |

Example 24:

| | |
|---|---|
| Diphenylamine g | 2.5 |
| Carbon tetrabromide g | 0.75 |
| Ethyl acetate ml | 1.5 |

The following exposure tests were made with each coated emulsion.

Example 21.—A dry sheet was exposed by contact behind a silver negative to a 275 w. G.E. RS sunlamp for one minute. A blue print-out image was obtained.

Example 22.—A dry sheet was exposed by contact behind a silver negative to a 275 w. G.E. RS sunlamp for one minute. A reddish-brown print-out image was obtained.

Example 23.—A dry strip was exposed by contact behind a silver negative to a 275 w. G.E. RS sunlamp for one minute. The exposed sheet was heated. A brown image was obtained.

Example 24.—A piece of dry paper was exposed behind a 21-step wedge to a 275 w. G.E. RS sunlamp for 8 minutes. A blue print-out 21-step "gray" scale was obtained.

EXAMPLE 25

Eight (8) drops of an Aerosol OT solution (37.5% in isopropanol) were added to 50 ml. of a 20% aqueous solution of gum acacia. An organic solvent solution (formulation given below) was added to the gum solution with high shear agitation. The agitation was continued until a fine emulsion was obtained.

| | |
|---|---|
| N-vinylcarbazole g | 2.5 |
| 4-(p-dimethylaminostyryl)-quinoline g | 0.002 |
| Carbon tetrabromide g | 0.75 |
| Benzene ml | 1.5 |

The emulsion was coated on baryta paper, dried and tested for photosensitivity. A strip was exposed for 30 seconds to an 8-diameter projection of a Kodachrome image, then heated to develop out a good negative image. Another strip was exposed and processed to give a good positive image. (The procedure used for obtaining a positive image was as previously described.)

EXAMPLE 26

To a 50 ml. portion of a 20% polyvinyl alcohol solution (a blend of Elvanol 51–05, 16% and Elvanol 50–72, 4%), 0.2 ml. of Tergitol Anionic 4 (25%) was added with high shear agitation. To this solution an organic solvent solution of the protoreactants (formulation below) was added and the mixture agitated until a fine emulsion was formed.

| | |
|---|---|
| N-vinylcarbazole g | 2.5 |
| 4-(p-dimethylaminostyryl)-quinoline g | 0.002 |
| Carbon tetrabromide g | 0.75 |
| Ethyl acetate ml | 1.5 |

The emulsion was coated on baryta paper, dried and tested. A strip from the coated paper was exposed for one minute to an 8-diameter projection image of a Kodachrome slide, then heated to develop out a good negative image. Another strip was exposed for 11 seconds to the same image, warmed with an electric heat gun, given a blanket exposure to light from a 275 w. G.E. RS sunlamp, then heated to develop out a good direct-positive image.

EXAMPLE 27

Eight (8) drops of Aerosol OT solution (37.5%) were added with high shear agitation to 50 ml. of a 10% corn starch solution in water. To this an NVC-CBr$_4$-sensitizer solution prepared according to the formulation given in Example 26 was added and the agitation continued until a fine emulsion was obtained. The prepared emulsion was coated on baryta paper and dried in a forced draft oven at 25° C. Exposure tests were made according to the procedures given in Example 15 to produce a good negative image and a good positive image.

EXAMPLE 28

Various dispersants were used in preparing emulsions of NVC-CBr$_4$ solution in aqueous gelatin solution. Photosensitive coatings were prepared from these emulsions by applying them on a paper support and drying.

General formulation for testing dispersants:

Gelatin (10%) (105° F.) _____ ml__ 50
Dispersant (active material) _____ g__ 0.1

Solution B

N-vinylcarbazole _____ g__ 2.5
4-(p-dimethylaminostyryl)-quinoline _____ g__ 0.002
Ethyl acetate _____ ml__ 1.5
Carbon tetrabromide _____ g__ 0.75

The dispersant under test was mixed with the gelatin solution using high shear stirring. To this, an NVC-CBr$_4$-sensitizer solution in ethyl acetate (Solution B) was added and the agitation continued for about 5 minutes until a uniform emulsion was obtained.

The emulsion was then coated on baryta paper, using a Bird blade applicator which gave a 3-mil wet thickness. Sample strips from the coated sheets, after drying, were tested in both the positive-working mode and the negative-working mode according to the procedures given in Example 15.

Tables VIII, IX and X summarize the results obtained with each dispersant.

TABLE VIII.—EXPOSURE TEST RESULTS FOR NVC-CBr$_4$-GELATIN COATINGS PREPARED WITH VAROIUS ANIONIC DISPERSANTS

| Dispersant | Mode of Operation | |
|---|---|---|
| | Positive | Negative |
| Aerosol OT (sodium dioctylsulfosuccinate) | Good | Good. |
| Aerosol OS (sodium diisopropylnaphthalenesulfonate). | ___do___ | Do. |
| Tergitol 4 (sodium tetradecyl sulfate) | ___do___ | Do. |
| Nekol BA-75 (sodium alkylnaphthalene sulfate). | ___do___ | Fair. |
| Tergitol 08 (sodium 2-ethylhexyl sulfate) | Fair | Good. |
| Duponol 80 (fatty alcohol sulfate) | ___do___ | Do. |
| Triton X-200 (sodium alkylaryl-polyethersulfonate). | Good | Fair. |
| Nopco Sulf-CA60 (sulfated castor oil) | Poor | Good. |

Image Quality Sequence: Good>Fair>Poor.

TABLE IX.—EXPOSURE TEST RESULTS FOR NVC-CBr$_4$-GELATIN COATINGS PREPARED WITH VARIOUS NONIONIC DISPERSANTS

| Dispersant | Mode of Operation | |
|---|---|---|
| | Positive | Negative |
| Triton X-100 (alkylaryl-polyether alcohol) | Fair | Poor. |
| Saponin | Poor | Good. |
| Aldosperse L9 (polyethylene glycol 400 monolaurate). | ___do___ | Fair. |
| Ethosperse SL-20 (polyoxyethylene 20 sorbitol) | ___do___ | Do. |
| Ethosperse G-26 (polyoxyethylene 26 glycerol) | ___do___ | Do. |

Image Quality Sequence: Good>Fair>Poor.

TABLE X.—EXPOSURE TEST RESULTS FOR NVC-CBr$_4$-GELATIN PREPARED WITH VARIOUS CATIONIC DISPERSANTS

| Dispersant | Mode of Operation | |
|---|---|---|
| | Positive | Negative |
| Aerosol C-61 (ethanolated alkyl guanidine amine complex). | Fair | Poor. |
| Victamine C | Good | Fair. |
| Hyamin 2389 (methyldodecylbenzyl-trimethyl-ammonium chloride). | ___do___ | Do. |
| Hyamin 10X (diisobutylcresoxy-ethoxy ethyldimethylbenzyl ammonium chloride). | Fair | Poor. |
| Triton X-400 (stearyl-dimethylbenzyl ammonium chloride). | ___do___ | Fair. |

Image Quality Sequence: Good>Fair>Poor.

In addition to the critical constituents of the emulsion product of this invention, that is, at least two photoreactive starting agents $a$ and $b$ in a dispersion medium $c$, ancillary agents may also be added, which agents perform various product-enhancement functions. Thus, shelf life stabilizers, plasticizers, opacifiers, pigments, antifoam agents, sensitizing dyes, and the like, can be added to enhance the properties of the products of this invention. It will be apparent that, although one or more of these agents may be present in the dispersion medium or in intimate association with either of the compounds $a$ and $b$, when referring to an intimate association of photoreactive agents, such terminology is without regard to the presence or absence of such ancillary agents.

Stabilization and/or shelf life for the compositions of the invention may be improved by the inclusion in the compositions of the invention of certain amides, phenols and amines (hereinbefore described), which materials are understood to enter into at least the physical combination $ab$, if not a complex or chemical type of combination with the starting agents $a$ and $b$. These shelf life or stabilizing materials are also employed, however, in comparatively small total proportions of the combination $ab$, i.e., within the range of about 0.01% to about 5% of the combination $ab$, and certain of these compounds may be characterized as compatible, cofusible, acid-acceptors. The amines are, of course, actually alkaline reacting. The amines which may thus be used are the various $C_2$–$C_4$ alkylene diamines, and the di- to hexa- ($C_1$–$C_4$) alkylene polyamines. The phenols that may be used for this purpose include mono- or dihydroxy aryl (benzene) compounds having as many as two $C_1$–$C_4$ alkyl groups attached to the benzene nucleus.

In order to evaluate storage stability of the films of the invention, the foregoing procedure of run 1A was repeated in subsequent runs numbered as indicated in Table XI hereinafter, but using the additives to the run 1A formulation hereinbefore specified, as set forth in Table XI. It will be appreciated that the additives specified in Table XI are added to the emulsion at substantially the same time that agent $b$ is added, primarily for the purpose of using uniform conditions for comparison. The additives employed are agent $d$ selected generally from the class consisting of "alkaline reacting" amine, phenol and amide additives compatible with the hereinbefore described combination $ab$. Such compatibility involves a substantial loss of identity of the agent $d$ in the instant emulsion, presumably by physical and/or chemical combination of such ingredients in the dispersed phase to obtain the uniformity or homogeneity characteristic thereof.

TABLE XI

| Run Number | Additives (d) to Run 1A Formulation |
|---|---|
| 1B | Formamide, ½ ml. plus hexamethylenetetramine, 0.10 g. |
| 1C | Dimethylformamide, ½ ml. plus hexamethylenetetramine, 0.10 g. |
| 1D | Acetamide, .024 g. plus hexamethylenetetramine, 0.10 g. |
| 1E | Toluhydroquinone, .025 g. plus hexamethylenetetramine, 0.10 g. |
| 1F | Mono-tertiarybutylhydroquinone, .025 g. plus hexamethylenetetramine, 0.10 g. |
| 1G | 2.5-ditertiarybutylhydroquinone, .025 g. plus hexamethylenetetramine, 0.10 g. |
| 1H | Hydroquinone, .027 g. plus hexamethylenetetramine, 0.10 g. |
| 1J | Hydroquinone monomethyl ether, .024 g. plus hexamethylenetetramine, 0.10 g. |

The paper sheets coated with the dried films obtained from runs 1A through 1J are stored for different periods of time in a dark room, under substantially uniform conditions in order to obtain indications of shelf life of the photosensitive coating. After such varying storage times, certain photosensitive sheets were exposed in the positive-working sequence hereinbefore described for run 1A, with variations in the initial exposure time from 0.4 second to 20 seconds in order to make comparisons as to photosensitivity and determinations as to the nature and extent of any decreases in photosensitivity during such storage. It is found that with longer storage the photosensitivity of this particular positive-working system tends to decrease; but this general effect is reduced by the use of the agents $d$ in the manner just described. Although it is not desired to limit the invention to any particular theory in this respect, it is believed that there may be a slight tendency for the carbon tetrabromide $b$ per se and/or in the combination $ab$ to release reactive entities that might tend to cause premature polymerization of the N-vinyl agent $a$ and/or desensitization of the combination $ab$ and a consequent loss of photosensitization in the film; and the instant additive agents $d$ are believed to stabilize this system. In particular, it is found that hexamethylene tetramine gives superior results in this respect. Essentially non-volatile amines are thus useful in this particular function. The phenols are also useful to give improved storage and shelf life, particularly when used in the systems described on Table I hereof. In general, the amides per se appear to be less effective.

In summary, then, it will be seen that using a preferred combination $ab$ of the invention involving a starting agent $b$ which is an organic halogen compound that may effect release of reactive entity or group (whatever the theoretical considerations involved), it is advantageous in the practice of the invention to improve shelf-life of the instant photosensitive compositions and/or films by inclusion in such combination $ab$ of a stabilizing agent $d_1$ in small amounts, ranging in the weight ratio of $d_1:b$ from a minimum practical amount of about 1:1000 to a maximum practical amount of about 1:2, such that whatever nominal amount of reactive groups might tend to be released during storage may be at least temporarily maintained substantially ineffective with respect to interference with the photosensitivity of the combination $ab$; but whatever reactivity that is involved in the desired photoreaction of such combination $ab$ will not be adversely affected. Such stabilizing agent $d_1$ is found to be preferably an alkaline-reacting amine or amide (e.g. hexamethylenetetramine) which is substantially non-volatile under normal (room temperature) storage conditions. In the foregoing runs 1B through 1J it will be found that the amine component alone is effective.

It will also be seen that using a preferred combination $ab$ of the invention involving a starting agent $a$ which is capable of addition polymerization, it is apparently advantageous to improve shelf life of the instant photosensitive compositions and/or films by inclusion in such combination $ab$ of a stabilizing agent $d_2$ in small amounts, ranging in the weight ratio of $d:a$ from a minimum practical amount of about 1:1000 to a maximum practical amount of about 1:2, such that whatever nominal amount of polymerization might tend to take place during storage may be at least temporarily inhibited; but whatever desired photo-polymerization that may be required at the time of exposure to actinic light will not be adversely effected. Such polymerization inhibitor type of stabilizing agent $d_2$ is found to be preferably a non-volatile, normally solid phenol and/or amine. As indicated in runs 1B through 1J, such agents $d_1$ and $d_2$ may be used as a combination stabilizing agent $d$, again in weight ratios of $d:ab$ ranging from 1:2 to 1:1000; such agents $d_1$ or $d_2$ may be used alone to advantage; and/or stabilizing agents having both of the functions described may be used effectively, as individual agent $d$, e.g. morpholine, as shown in Example 29 hereinafter.

EXAMPLE 29

The procedure hereinbefore described for run 1 is repeated using the following formulation:

Agent $a$, 2 g. of N-vinylcarbazole
Agent $b$, 2 g. of carbon tetrabromide
Agent $d$, ½ ml. of morpholine, and
Continued phase $c$, 20 ml. of 15% aqueous gelatin In addition, $e$ 5 ml. of commercially avaliable very fine 15% colloidal silica ("Ludox LS" composition) was added, and this colloidal material will, of course, form a non-photosensitive dispersed phase component. Such colloidal silica as well as a number of conventional opacifiers, which are similar generally inert (and usually inorganic) dispersible materials, may be incorporated in the dispersions used in the practice of the instant invention for a number of reasons and in order to obtain a number of improvements which will be described; but it will be appreciated that in describing the dispersion of the invention in the claims hereof, the inclusion of these various photo-insensitive types of dispersions is not precluded by reference to a photosensitive dispersion system and/or a photosensitive dispersion phase combination $ab$ having certain characteristics.

In the procedure of this example, the colloidal silica is added initially to the aqueous gelatin, and in processing the resulting dried films through the positive-working procedure (after using different shelf life or storage test times), it is found that the photosensitivity of the film is improved by the morpholine. It is also found that the addition of the extremely fine sized inert inorganic particles $e$ in the form of the colloidal silica described herein improves the picture quality. It is thus found to be preferable in the practice of the instant invention to include in the film forming composition, fine sized (i.e. in the colloidal range of one micron down to about 100 A.) particles of essentially inert material, at least with respect to the chemistry of the photographic process, and such material, e.g., in the form of the colloidal silica particles is incorporated herein preferably in proportions such that the weight ratio of $e$ to the continuous phase $c$, on a dry solid film basis, ranges from about 1:2 to about 1:20.

EXAMPLE 30

A procedure is carried out that is the same as that described in Example 1, run 1, except that 5 grams of beeswax is added with the N-vinylcarbazole and the initial substantially uniform emulsion is then formed with a combination of beeswax and N-vinylcarbazole as the dispersed phase. It is found that the carbon tetrabromide readily enters the dispersed phase, quickly forming a uniform emulsion, and the resulting photosensitive film is found to have enhanced photosensitivity. In general, one of the particular advantages of the instant invention resides in the fact that the two essential reactants in the color-forming photosensitized process (i.e. in this case the N-vinylcarbazole and the carbon tetrabromide) are combined in the dispersed phase in the intimate molecular relationship which imparts improved photosensitivity and improved control of the photographic process. It is also advantageous to be able to add these two materials as such without the necessity of adding miscellaneous solvents and/or dispersing agents with these materials in the formation of the desired emulsion and/or the resulting film dispersion. On the other hand, certain additives in the dispersed phase, when used in reasonably moderate amounts so as not to dilute down the intimate molecular association between the principal photoreactants do appear to perform in one way or another so as to exhibit synergism with respect to certain desired results. Thus, as previously described the beeswax appears to impart improved photosensitivity to the system and, therefore, to the dispersed phase of the system; whereas better shelf life is imparted to the system, in the case of the various amines, phenols and amides, more specifically described in Example 1. The results described in connection with beeswax are substantially repeated using an equal quantity of fatty acids such as myristic, palmitic and/or stearic acids, or spermaceti (which is chiefly cetyl palmitate). In general, it is found that a desirable effect is obtained in the practice of the invention, if the amount of such wax-like materials is limited to about 5 to 50% of the combination $ab$, using such wax-like materials as beeswax, $C_{12}$–$C_{26}$ fatty acids (e.g. lauric, myristic, etc. up to cerotic acid which is a $C_{26}$–fatty acid in beeswax), and the $C_3$ and higher alkyl esters of such fatty acids (e.g. isopropyl myristate up to e.g. cetyl palmitate). It should be noted, however, that excessive amounts of such wax-like substances appear to make the system impractical because of a very rapid loss of shelf life, and a single phase or substantially single phase system comprising N-vinyl-carbazole, carbon tetrabromide and a significant amount of any of these wax-like materials, i.e. amounts in the range of 100% or more of the combined N-vinylcarbazole and carbon tetrabromide, is not practical for this reason.

EXAMPLE 31

In the aforesaid Wainer Patent No. 3,042,516, it is suggested that certain organic and inorganic sulfur-containing compounds may be employed in substantially single phase solutions of color forming systems such as combinations of diphenylamine and carbon tetrabromide. Such sulfur compounds are alleged to be stabilizers. In the practice of the instant invention, the procedure of run 1A is repeated, but 0.1 gram of thiourea is added with the N-vinylcarbazole; and a resulting photosensitive film is obtained, with a moderate improvement in shelf life and storage stability. The improvement in the dispersions of the instant invention, however, is distinctly inferior of that obtained employing the corresponding amounts of the hereinbefore described phenols and amines, in accordance with the procedures of the various runs of Example 1.

EXAMPLE 32

The procedure of Example 29 is repeated using, in place of the colloidal silica, very finely ground pigment size particles of zinc sulfide (0.3 g.), and the zinc sulfide functions essentially as a separate water-borne colloidal-like inorganic particle phase. It will be appreciated that any of a number of substantially inert (with respect to photosensitivity) pigments may be employed in the practice of the instant invention to give background color or perhaps to stabilize the ultimately formed picture. In general, such inert inorganic pigments do not become incorporated in the essential dispersed phase combination $ab$, and such pigment materials, opacifiers, and the like function essentially as inserts with respect to the photosensitive aspects of the film. If these various particles are very fine, as in the case of the colloidal silica, they may also improve picture quality; but the preferred type of colloidal size inorganic particles for this use are the substantially colorless silica colloidal systems hereinbefore described.

Although it is apparent that the photosensitive systems hereinbefore described are sensitive primarily to blue and ultraviolet light, it will be appreciated, as indicated hereinbefore, that sensitizing dyes may be used to extend the sensitivity into the green and red regions of the spectrum. For example, the cyanine dyes, such as pinacyanol (which is a known dye for sensitizing photographic silver systems) may be used. The procedure of Example 1 is repeated, except that 0.5 ml. of pinacyanol is premixed with the N-vinylcarbazole and added with the N-vinylcarbazole to the aqueous system in the blender. Otherwise the procedure of Example 1 is repeated and the resulting film is found to have photosensitivity to light in the higher wavelengths (e.g. 4800 to 7800 A.). The controlled use of this blue dye in the particular system of Example 1 may effect a moderate neutralization of the slight or mild yellow cast ordinarily obtained in the initial production of the film (by virtue of the formation of the combination of N-vinylcarbazole and carbon tetrabromide).

Other dye types that can be used to sensitize the photosensitive systems of this invention include: triphenylmethyl dyes such as malachite green and crystal violet; xanthene dyes such as rhodamine B and eosin B; cyanine dyes such as ethyl red, quinaldine red and neocyanaine; styryl dyes such as 4-(p-dimethylaminostyryl)-quinoline dye or dye base; anthraquinonoid dyes such as alizarin; acridine dyes such as acridine orange; and thiazine dyes such as methylene blue. Particularly effective dyes include: 2 - (2 - aza-p-dimethylaminostyryl)-benzothiazole, 2-(p-dimethylaminostyryl) - 3,3 - dimethylindole, 2-(p-dimethylaminostyryl)-benzothiazole, 2 - (p-dimethylaminostyryl)-quinoline, 2-(2 - aza-p-dimethylaminostyryl)-benzimidazole, 2-(2 - aza-p-dimethylaminostyryl)-thiazole, 4-(p-dimethylaminostyryl)-quinoline, 2-(p-dimethylaminostyryl)-benzimidazole, 2-3-(3-ethyl - 2(3)-benzothiazolylidene)-propenylquinoline and 2-(p-dimethylaminostyryl)-pyridine, and the dye bases of each of the above.

The following example illustrates the use of such dyes and bases:

The following coating formulation was prepared and applied on vellum:

| | | |
|---|---|---|
| Gelatin | g | 10 |
| Water | ml | 36 |
| N-vinylcarbazole | g | 2.5 |
| Carbon tetrabromide | g | 0.75 |
| 4-(p-dimethylaminostyryl)-quinoline | mg | 2 |
| Dow Corning Antifoam D | drops | 6 |
| Triton X–100 | drops | 2 |
| Formalin | drop | 1 |

A coated sheet was exposed to a projected image of a microfilm negative in a 300 W. Bell & Howell Headliner Projector (8-diameter enlargement) for 30 seconds and the image was developed with heat. A positive image was obtained. When the developed sheet was brought out into room light, the previously unexposed areas turned pink which then faded to a pale buff in about 5 minutes upon standing in room light.

The photosensitive compositions or dispersions of this invention may be coated on supports which are either opaque, transparent or translucent such as paper, baryta-coated paper, vellum, plastic sheets, glass, materials and the like. The films can be applied by well-known techniques used in the preparation of silver halide films, such as by the use of a Bird coating bar drawdown technique or by use of a Meyer bar, and the like. Coating thicknesses can range from about 0.05 mil to about 10 mil, with 0.5 to about 5 mil being preferred as yielding better photographic results.

The film may be dried by known techniques, e.g., in a darkroom drier, with an air current, or by just standing in the darkroom until the film is dry to the touch. In this respect, this is the meaning of the term dry when applied to films of this invention, because it will be appreciated that films of this type tend to retain a certain amount of water permanently and even variable amounts of water depending upon the relative humidity and such other factors involved in storage. In thus referring to these materials as being dry films, it will be understood that dry to the touch is the simplest test for practical purposes and it serves to indicate a significant or substantial solidification of the continuous phase (whether or not by virtue of its thixotropic properties), and a practical condition in which the film may be used without sticking to other sheets or otherwise complicating the handling thereof for purposes of storage and ultimate use.

In a particularly preferred embodiment of this invention, a formulation particularly suitable in the negative-working system of this invention is applied to a transparent or translucent sheet, such as vellum. The sheet is then exposed to a negative microfilm image and processed, as per the negative-working aspects of this invention, to yield a positive image on vellum which can then be used as a Diazo master to make multiple copies.

In considering certain preferred embodiments of the instant invention, it is not desired to limit the invention to any particular theory, but certain definitions are helpful.

A positive copy is a copy which has the same total order as the original subject. A negative copy is a copy which has the reverse of the tonal order of the original subject. A positive-working system is one which does not reverse the tonal order of the copied subject. A negative-working system is one that reverses the tonal order of the copies subject. A printout image is a visible image formed directly by light. A latent image is an "invisible image" (or weakly visible image) requiring subsequent chemical or physical development to become visible (or intensified).

Actinic light, as the term is used herein, may range from ultraviolet through visible, which would be a range from about 2000 A. (using quartz with the light source) up to about 7800 A.; and in more practical embodiments of the instant invention using a system involving glass, about 3300 A. to 7800 A. Actinic visible light is, of course, light within the visible range of about 3800 A. to 8070 A. Actinic light for the halogen-containing systems of the instant invention, although readily ascertainable by a simple experiment, may be different for different systems, but has generally been found to be within a practical range of 200 A. to 4800 A. (using quartz) or about 3000 A. to about 4800 A. (when the lower limit is affected by the use of glass). But these ranges may be extended to longer wavelengths by sensitizers.

Color is generally understood to involve selective visible light absorption. The color that we see is color that is not absorbed. Neither white nor black is a selective visible light absorber. Black is a color to the eye (and as used herein) although it absorbs substantially all incident visible light, and reflects or transmits substantially none. White is here considered to be no color, rather than "a color," in that it reflects substantially all incident "white" light and absorbs substantially none.

A translucent material is considered to have the ability to transmit light, diffused or otherwise; and the term "transparent" is a species of translucent involving the ability to transmit a light image (as contrasted to merely diffused light).

Colorless, as used herein, is intended to mean no significant visible variation between incident white light and reflected or transmitted light coming from the object to the viewer either passing through a film (e.g. as in the case of a transparency) or passing through a film or layer in both directions (on a reflecting surface). Thus, in the case of the instant invention, colorless means no significant visible light variation in incident white light passing through a film of or containing materials of the invention.

The term selective light absorbing agent as employed herein, and in the claims is understood to mean materials which absorb selectively electromagnetic radiation (both visible and invisible, e.g., in the range of about 2000 to 7800 A.).

The term coloring agent, as employed herein and in the claims, is understood to mean a material that is black or a material which imparts color or hue to the medium in which it exists by selective absorption of visible light (i.e. 3800 to 7800 A.) to which it is subjected. A yellow coloring agent selectively absorbs some incident light (e.g. blue) but transmits the rest through a transparency or transparent medium and/or it selectively absorbs some incident light (e.g. blue, again) and reflects some yellow light—which in either case results in visual observation of a yellow color.

In the practice of the instant invention, it is found that the individual starting agents $a$ and $b$ are each per se selective light absorbers, and in combination they may form a different selective light absorber. Such selective light absorbers are not necessarily visible light absorbers, but absorptivity can be demonstrated with instruments (such as the spectrophotometer). For example, N-vinylcarbazole and carbon tetrabromide are each per se colorless, selective light absorbers which in the preferred combination of the invention form a colored selective light absorber. This is, however, a very light or mild yellow "background" color which is imparted by the combination of these ingredients in dispersed form in a translucent film of the invention. Initial exposure to visible actinic light (possibly involving polymerization) in this particular system is believed to be the cause of a change in the light struck areas which apparently precludes subsequent color formation; whereas subsequent exposure of the non-light struck areas to actinic (ultraviolet) light and heat in the case of the use of this system in the practice of the invention is understood to result in a chemical reaction between the ingredients to form a color change (i.e., a change in selective absorptivity of visible light) by chemical co-reaction of the ingredients under the influence of light.

The instant invention involves a chemical and/or photochemical sequence concept and it also involves certain physical or physical chemical concepts of considerable importance. For example, in the preferred embodiment of the instant invention, a dispersion is formed of a dispersed phase of photo-reactive materials or combinations of materials that are substantially insoluble in a continuous substantially transparent or translucent phase. In a film of the invention, the continuous phase is, of course, a solid and the invention affords the advantage that the dispersed phase may and preferably is also a solid. The dispersed solid phase is formed from normally solid materials which are liquefied (preferably by melting in violent agitation in situ in the continuous phase), thoroughly dispersed in the continuous phase by violent agitation, and solidified in situ in the continuous phase, preferably without agglomeration.

The preferred compositions of the invention further distinguish from a system of particles ground in or precipitated chemically from a given vehicle (even if such particles are very fine) for the reason that the instant compositions behave as intrinsic (as contrasted to extrinsic) colloids; i.e., the surface activity of the particles appears to be that of spontaneously formed, thermodynamically stable colloids. This may well be (and is believed to be) a result of interfacial activity, tension, forces, etc., created in the orientation of the initial dispersion of the dispersed ssytem in liquid forms, and carried over during the solidification of the dispersed system particles in situ. Ground particles or those formed by chemical precipitation of materials from a solution in the vehicle have a characteristic rough surface; and the particles of the invention, particularly in the larger and more readily observed sizes are found to be rounded or spheroidal in shape. The optical properties of the invention demonstrate this physical property. It will be understood from the instant disclosure that the term in situ, with reference to fine particle formation in the continuous phase, does not preclude certain alteration, dilution, concentration, etc., of the continuous phase subsequent to such formation in situ. In general, however, in the practice of the instant invention the dispersed particles are solidified in situ and the solid film-forming continuous liquid phase is preferably of such character that it will solidify very rapidly upon cooling; and the composition of the invention is thus preferably taken through concurrent cooling and film formation such that the solidification of the dispersed particles in situ may take place concurrently with the formation of the solid film. The particles dispersed in the composition of the invention exhibit the intrinsic colloidal properties in that they apparently do not undergo substantial agglomeration during such cooling and film-forming procedure.

The stability (i.e., colloid-type of stability) of the instant invention is thus an important characteristic. In the preferred form, the particle concentration is substantial, and it is believed that the more important factor of the stability is apparently based upon the so-called "envelope" theory of colloid formation wherein the particles are believed to be enclosed in an envelope of the continuous phase molecules such that the individual particles repel each other (although the generation of a colloid-type repelling electric charge cannot be discounted).

The preferred procedure of invention involves a controllable combination of viscosities in the continuous and dispersed phase, temperatures and degrees of violent agitation which, in turn, result in controlled uniformity and character of combination of the ingredients within the dispersed phase particles, controlled overall particle size, and preferably controlled formation of substantially spheroidal particles.

Still another very important aspect of the instant invention resides in the purely physical concept of the formation of generally spheroidal dispersed particles. The particles are observed to be spheroidal in many cases, but they are understood to be generally spheroidal in practically all cases involving the formation of a liquefied dispersed phase in the practice of the invention. It will be appreciated that precipitated or ground particles have rough or fractured surfaces which will necessarily cause substantial light diffusion (since it is a practical impossibility to match exactly the light transmitting characteristics of the film and the dispersed phase). This light diffusion is caused not only by the so-called "frosted glass" effect of the roughened surface, but it is also believed to be caused by a characteristic of most rouhgened surfaces to retain occluded gases, etc., on the surfaces thereof which will further complicate the light diffusion problem. In contrast, an essentially smooth spheroidal surfaced particle will have a minimum of light diffusion.

Still another particularly important aspect of the instant invention involves the unique and superior results that are obtained in the practice of the instant invention using a procedure which involves liquefication of at least one of the dispersed phase components forming a significant or substantial portion of the overall dispersed phase. Such liquefication, it is believed, may impart to the liquefied component the properties of a "scavenger" in that it will collect, combine with, dissolve and/or chemically react with the one or more additional dispersed phase components. In this respect, an important aspect of the procedure of the invention involves the use of dispersed phase components which are substantially insoluble in the continuous phase (particularly while the continuous phase is in liquid form). In such a system, the molten or liquefied dispersed phase component functions in most instances to collect and physically or chemically combine with the other dispersed phase components.

In instances where the various dispersed phase components, with one or more in liquefied form, have mutual attraction and/or miscibility, this mutual attraction and/or miscibility is satisfied in the practice of the instant invention during the violent agitation, in accordance with the fundamental laws of physical chemistry; and it is thus believed that the individual discrete globules or molten or liquefied dispersed phase particles acquire a substantially uniform, homogeneous composition. Such uniform homogeneous composition may be merely a form which ultimately results in a solid solution in the finally dispersed phase in the film, or it may be a combination in the form of a complex or even a chemical reaction or combination of the ingredients. In any event, it is believed that this procedure results in the formation of such an intimate combination of the dispersed phase ingredients that the effect of impinging actinic light may be controlled, and particularly the effect of such actinic light may be greatly accelerated by such intimate combination of the ingredients. In this respect, it will be appreciated that even a solid solution of one of the dispersed phase ingredients in very discrete particles of another of the dispersed phase ingredients results in a much more intimate association or combination of these ingredients than would theoretically be possible in the case of a solution involving miscible or substantially miscible solid film-forming material, the solvent therefor, and each of such photoresponsive materials (which are preferably separately combined in the dispersed phase in the practice of the invention). This intimate combination of the dispersed phase photosensitive materials in the practice of the instant invention is believed to result during the mutual liquefication thereof, or at least as a result of the liquefication of a substantial proportion of the combination thereof; and it is further believed to be enhanced functionally as a result of the subsequent preferred solidification in situ of the dispersed phase particles (which necessarily results in a most intimate physical relationship between the molecules thereof, in the absence of other non-functional or non-actinic light absorbing components or elements including selective or mutual solvents therefor).

It will be appreciated that each and every one of the foregoing physical, physical chemical and/or chemical phenomena may not and very probably do not occur in every instance and may not be and very probably are not desired in every instance. A particular advantage of the instant invention, however, is provided by the unique concept of affording a significant substantial measure of control with respect to these various phenomena so that a number of unusual desired results are made possible.

For example, in the practice of the instant invention using N-vinylcarbazole and carbon tetrabromide as the initial photosensitive components for the dispersed phase in, for example, an aqueous gelatin solid film-forming continuous phase; the system involves a rather substantial amount of the N-vinylcarbazole. In the preparation of the composition, there is an advantage in being able to add the N-vinylcarbazole and the carbon tetrabromide as such without further modification, and then violently agitating the same in the aqueous gelatin system under controlled conditions regarding the degree of violent agitation as well as the temperatures involved. It is necessary merely to heat the system to a temperature at least sufficient to melt the N-vinylcarbazole, and it is not necessary to heat the system to a higher temperature necessary to melt the carbon tetrabromide per se (which might be lost to a significant extent at such more elevated temperature). The N-vinylcarbazole and carbon tetrabromide are substantially colorless per se, although it will be found that each per se is a selective light absorber, primarily in certain ranges of ultraviolet. In the process of the invention, however, merely the liquefication of the N-vinylcarbazole with carbon tetrabromide results in a new combination evidenced by a mild yellow color formation in the composition. This thus involves the formation of a new selective light absorber system, and in this particular situation the new selective light absorber system is a coloring agent, because it exhibits a visible color. Obviously, some significant change has taken place between the N-vinylcarbazole and the carbon tetrabromide in the practice of the invention, as evidenced by the color change. It is also apparent that the liquefied N-vinylcarbazole must have combined in one form or another with the carbon tetrabromide and this combination (even in a "purely" physical combination of an ultimate solid solution) is a different selective light absorber. Essentially the aqueous gelatin system is translucent and even transparent, and it is not understood that this aqueous gelatin system in liquid or solid form per se undergoes any subsequent chemical correaction with the N-vinylcarbazole and/or the carbon tetrabromide under the influence of actinic light (although the aqueous gelatin system does impart superior properties to the compositions and films of the invention for reasons which are now believed to be primarily physical rather than chemical in nature).

In the foregoing system, however, the photosensitivity is greatly increased and is controllable so as to obtain distinctly superior photographic properties, as compared to a comparable system wherein a film is deposited from an organic solvent *solution* of the N-vinylcarbazole, the carbon tetrabromide and what is understood to be a substantially inert (with respect to actinic light) transparent solid film-forming material.

From the foregoing, it will be appreciated that the invention relates to photosensitive compositions and to photosensitive sheet products made therewith and to the methods of making the photosensitive compositions and of making the photosensitive sheet products, and further to the methods of exposing and processing these products and compositions to produce photographs and graphic copies. It will be appreciated that the compositions in their prepared form, and before filming and drying, have utility as such, in that they may be stored in dark rooms and/or shipped to various users in the emulsion form or at least with the continuous phase in liquid form, so that the end user might employ the compositions for the production of films of his own choice. The compositions thus afford an opportunity to avoid any inconvenience that might be involved in the case of certain films of the invention in which the materials are sufficiently reactive to impart a relatively short shelf life to the films. Also, such compositions may be additionally stabilized, for example, by adding a volatile alkaline material such as ammonia to the continuous aqueous phase, and retaining the same during storage. Such volatile alkaline material could then be removed conveniently at a later date immediately before, or even at the time of filming of the composition, e.g., by neutralization.

As noted, the photosensitive compositions, films and products of the instant invention, which will be described in further detail in examples to follow, can undergo exposure to visible light initially in the positive-working system. The exposure to visible light may take place in a camera, or such exposure may be to a projected image from a slide projector or enlarger of a black-and white positive slide or color transparency. In addition, contact-exposure to light behind an original copy on a translucent or transparent base, or contact-exposure in front of an original copy such as in the so-called reflex method can be processed to become a direct positive photograph or copy in the practice of the invention.

Another aspect of this invention, in connection with the positive-working system, is to provide the aforesaid photosensitive compositions, films and products which after an imagewise exposure to light to produce a latent image (as described in the previous paragraph), can be processed by entirely dry means to develop the latent image. As described, means which are utilized to develop the latent image are blanket exposure to a second wavelength-intensity-exposure of light such as (1) blanket exposure to ultraviolet or (2) blanket exposure to ultraviolet followed by heat, which can be applied directly or by infrared radiation.

The positive-working sequence thus described affords unusual advantages in simplification of camera structures and/or document reproducing devices, as indicated essentially diagrammatically in FIGURES 2 and 3 hereof. For example, in FIGURE 2 hereof a light tight enclosure for a simplified camera structure is indicated in full lines at 20, with such camera structure 20 being provided with a conventional lens and shutter system indicated diagrammatically at 21 in the front of the camera and an opening top wall 22 swingably mounted on an upper light sealed hinge 23 and adapted to swing down against a lower light seal at 24 to effect light tight closure of the camera box 20. The top wall is also provided with forward and rear interior light seals 25 and 26 bridging a rear winder (indicated at W) which is closed by a smaller door 27 swung on a light sealed hinge at 28 and swingable light sealing engagement with the lower interior seal 26.

A roll of film F in the form of a continuous leader having a plurality of successive or sequentially spaced photosensitive films on baryta paper of the type described in Example 1 hereof is mounted in the camera box 20 in conventional manner (with the door 22 open), and the leader L is drawn around an idler roller 30 and back out through a light seal slot between light seals 29 and 24, with the leader L indicated diagrammatically. The leader L is moved to position a first photosensitive film F in a first station in the camera, so that exposure to visible light through the lens and shutter system 21 (and mirror 21a) may be accomplished in the conventional manner for taking pictures with a camera. It will be appreciated that suitable other mirrors and other elements desired for camera use can be used.

After the initial exposure of the photosensitive film P to visible light for an imagewise exposure through the lens 21, the photosensitive film P can then be exposed to a suitable additional source of actinic light, such as conventional ultraviolet tubes indicated within the camera box at 31 and 32, or infrared tubes in the same position or one ultraviolet or one infrared tube. The blanket exposure of the film P is this carried out in the same station as that used for the initial visible light exposure. If heat is applied to this same station, for example, via the element designated 33 within the camera box 20, it will be appreciated that the entire dry process positive picture production is accomplished at a single station in the camera. The actinic light sources 31 and 32 as well as a heater mounted on the element 33 can, of course, all be actuated electrically with suitable switches and connections to a source of portable electric power or a regular household outlet.

It will also be appreciated that the initial exposure to visible light followed by the blanket exposure to ultraviolet light at the initial station for the film P can readily be carried out and then the film P so treated can be moved via the leader L around the roller 30 and to a position directly opposite the rear window 27. If the positive picture were then developed, the window 27 could be opened and the film torn from the leader by conventional procedure. If the film is not developed fully as a positive picture, it will be appreciated that in the second station here shown opposite the rear window 27, at the location indicated by P', the film P' could then be heated to complete the development thereof, and in the embodiment shown in FIGURE 2, a conductor heating surface is indicated at 34 for contact heating with the film P' and the conductor heating surface is mounted on a suitable insulator 35 carried by the interior structure 33, so as to protect the roll of film F and the first station P against excessive heating. In this situation two stations P and P' are required, but the use of these two stations P and P' is greatly simplified by the dry process here involved. In fact, it will be appreciated that the full development of the positive picture in connection with sensitive embodiments of the invention may be obtained by ultraviolet light alone. In such instance, it will be appreciated that the initial imagewise exposure of a film P is taken through the lens 21 at the first station, and without any further processing whatsoever, the film is moved to the second station P' via the leader L and the window 27 is opened to expose this film to northern light sky or sunlight generally or any artificial source of ultraviolet light. The ultraviolet light in any of the foregoing sources will complete the development of the positive image on the film at the second station P', or alternatively, it will be appreciated that the film could actually be removed from the camera (e.g., via the window 27) immediately after the initial imagewise exposure to visible light through the lens 21 at the first station P, and the film could then be exposed to sunlight or any suitable source of ultraviolet light for completion of the development. It will be appreciated that heat greatly accelerates this development process and the use of heat is considered to be more practical when time is of the essence.

Referring now to FIGURE 3, it will be seen that the the essential elements of a document reproducing machine are also minimized by the greatly simplified dry positive-working process to which the instant invention is uniquely adapted. For example, in FIGURE 3, a light tight machine frame is indicated generally in section at 50, comprising a window at 51 on which a document D is positioned for reproduction. Sheets S of the photosensitive film of Example 1 hereof are stacked on a movable platform indicated at P, and simultaneously actuated rollers R,R actuated by a control box 52 and working against conventional idlers 53 and guides 54 serve to move the top sheet $S_1$ of the stack of sheets S up to a first station where it is pressed against a transparent glass window G. Imagewise exposure of the film at the initial station behind the glass G is carried out by simplified means such as a timed shutter (not shown) coacting with lens 55a or 55b affording exposure of the document image through the window 51 illuminated by a suitable light source at 56, and via the 45° mirror 57 through the glass G to the film in the film in the first station. During such exposure, the sequentially operated rollers R are held still, and after such exposure they are actuated once more to move a fresh sheet into the position against the glass for the next imagewise exposure and to move the previously exposed sheet or film onto the surface of a heated drum 58 provided with conventional guide rollers 59 to hold the sheet against the heated drum 58. As the film with the initial latent image thereon is moved onto the surface of the heated drum 58, it is simultaneously exposed to an ultraviolet light source mounted at 60, so the development of the positve image is effected by an initial ultraviolet exposure from the source 60 followed by heating via the drum 58, with the hot drum temperature maintained such that the necessary heating is effected near approximately 180° of travel about the drum, and the sheet here indicated as S–3 is then fed out of the reproducing device through a conventional slot at 61. Although it is intended that the devices of FIGURES 2 and 3 are essentially diagrammatic in character and refinements and modifications might be employed to effect various practical embodiments thereof, the advantages of the dry positive-working process of the instant invention are demonstrated and the devices indicated in FIGURES 2 and 3 are greatly simplified because of this. The document reproducing device 50 of FIGURE 3 thus requires only two stations, one behind the glass plane G for the imagewise exposure and a second at the hot drum 58 for the positive picture development. It will be noted that in the case of certain positive-working systems of the invention the two light sources 56 and 60 may be the same or different. Thus in situations wherein the initial exposure can be carried out by the use of essentially the same source of actinic light as that required for the final development, the light source 56 and 60 can be the same device, otherwise they are conveniently mounted in a compact single location within the machine, so that convenience of providing only a single location for actinic light source is afforded.

EXAMPLE 33

A charge of a, 5 grams of N-vinylcarbazole (melting point 65–67° C.), as a starting agent, and c 10 grams of starch in 90 milliliters of water, as a continuous phase, is violently agiated at high speed in a Waring blender, with heating up to a temperature of 70–72° C. primarily as a result of the dispersing effect of the blender over a period of 10–15 minutes, with each high speed agitation being continued at such temperature for a time (e.g. 2–3 minutes in this run) sufficient to obtain a substantially uniform "agent-in-water" emulsion (which time is preferably held to the minimum permitted to obtain a uniform emulsion). Once the dispersed agent is liquefied, its fundamental characteristics such as particle size, etc. may be controlled within limits by selection of time temperature-agitation conditions.

At this state, the substantially uniform emulsion is understood to comprise c an aqueous-starch substantially-translucent-solid-film-forming vehicle, functioning as the continuous phase, containing intimately dispersed therein a dispersed phase consisting essentially of a N-vinylcarbazole in monomeric molten or liquefied form reduced by the viscosity differences between the phases and the violent agitation to substantially fine-sized, discrete, rounded, generally spheroidal (if not actually spherical) globules (i.e. liquefied dispersed particles) which are substantially insoluble in the continuous phase c.

Next, a charge of b 0.5 gram of hexachloroethane (sublimes at 187° C.), as a second starting agent, is added to the blender with continued high speed agitation at the temperature of 70–72° C. until a substantially uniform emulsion is again obtained, which takes only 1–2 minutes (which time is preferably held to the minimum permitted to obtain a uniform emulsion).

At this stage, the emulsion is understood to comprise substantially the same continuous phase c with a different dispersed phase wherein the molten N-vinylcarbazole a has fused with the hexachloroethane b, which starting agents a and b are believed to be miscible under these conditions, to form a new combination ab that is in molten or liquefied form reduced by viscosity differences between the phases and the violent agitation to substantially fine-sized, discrete, rounded generally spheroidal globules, which are substantially insoluble in the continuous phase c.

As soon as the substantially uniform emulsion of the previous paragraph is obtained, agitation is discontinued and then the emulsion is applied to a sheet of translucent (vellum) paper in a wet film thickness of 3 mil (using the Bird coating bar drawdown technique). The dispersed phase combination ab solidifies quickly in situ in the film-forming vehicle c as the emulsion is cooled, to form substantially uniform sized, discrete substantially non-agglomerated, generally spheroidal solidified particles having an average particle size or diameter of about 3–4 microns (within an approximate range of about 0.3 to about 10 microns).

The paper sheet with the wet film coating thereon is placed in a dark room dryer at room temperature for about ½ hour, to obtain formation of a dry solid continuous phase c, i.e., that is dry to the touch, whereby a substantially translucent continuous phase film is obtained having a uniform (colorless) appearance. This film is photosensitive and (with certain exceptions hereinafter noted) it should be kept until ready for use in the substantial absence of strong ultraviolet actinic light and the preparation thereof including the production of the emulsion itself hereinbefore described is, of course, carried out in the substantial absence of such actinic light. An advantage of the invention is that precautions ordinarily taken in silver photography are not here necessary.

The starting agents a and b are each separate and distinct light absorbers; each is substantially colorless as such when dispersed or dissolved in a transparent inert carrier (and each is substantially insoluble in the continuous phase c, in liquid or solid form). The co-fusion, co-liquefication and/or solution (and/or mutual plasticization) which takes place in situ in the continuous phase c between the starting agents a and b results in a very intimate, substantially homogeneous combination ab during such violent agitation and heating; and, during the overall time-temperature cycle here used, such dispersed phase combination ab ultimately solidifies in situ in the continuous phase c, in a system characteristic of an intrinsic colloid, evidenced in part by non-agglomeration of such solidified (or solidifying) particles, which highly desirable property is believed to be enhanced by such solidification in situ.

The dispersed or solidified combination ab is understood to possess within the individual particles substantial homogeneity characteristic of the solid solution state, and although the existence of the academically true solid solution is very difficult to evaluate as a practical matter these particles possess homogeneity such that they are here characterized as being solid solutions. The combination $ab$ has separate and distinct light absorption characteristics, which in this particular case differ only slightly from the substantialy colorless starting agent $a$. The change from substantially colorless starting agents $a$ and $b$ to the combination $ab$ may be a chemical combination of a complex, if not a truly new chemical compound. Moreover, it will be seen that this combination $ab$ is not merely premature photo-development or photochemical reaction, since this photosensitive dispersed phase combination $ab$ is capable in response to sequential exposure to actinic light and heat of conversion to a distinctly colored product (having a tan color), which has light absorptivity separate and distinct from that of the individual starting agents $a$ and $b$, as well as the combination $ab$ thereof initially obtained in the film.

The change in light absorptivity obtained in the photosensitive combination $ab$ from that of either starting agents $a$ or $b$ does not, however, necessarily involve complete chemical change and/or complete loss of chemical identity of the starting agents $a$ and $b$ at this stage. In fact, the indication is that each particle of the combination has the characteristics of a solid solution of $a$, $b$ and the interaction product $ab$ thereof, because of the apparent molecular intimacy of the association of the components evidenced by their ready reactivity and high photosensitivity.

In this respect, it will be understood that the term "light absorptivity" (or the term "light absorber" of actinic light) is understood to involve a substantial or significant quantitative and qualitative absorption of actinic light (within the available range of wavelengths). Even if this combination $ab$ were purely physical, e.g., a solid solution only, the different characteristic light absorptivity thereof can be (and in many such combinations of the inventions probably is) the result merely of the creation of a physical system within the particle wherein a given particular light absorption characteristic (in quantity and/or quality) will dominate.

Negative-working system of Example 33

The foregoing sheet of transparent (or translucent) paper with the dried emulsion film applied thereto (as described in Example 1) is then initially exposed for 15 seconds to a 15 diameter image formed by a blowup from a microfilm negative in a microfilm projector using a 500 w. mercury arc lamp as a light source (which includes light of wavelength in the range 3500–3700 A.). Next, the exposed sheet is heated to 350° F. to develop a "positive" image (which would now correspond to the positive from which the negative microfilm was made).

After the image has been brought out by heating at 350° F. for a period of about 15 seconds, the resulting developed film, which is functional as a developed diazo intermediate, is (photographically) desensitized by exposure to ammonia vapor, e.g., by passing such developed diazo intermediate through the ammonia unit in a conventional diazo printer. (It is estimated that this conventional procedure involves exposing the film to approximately 10 to 1000 times its volume of ammonia vapor over a period of about 30 seconds and at a film temperature of about 100–200° F.). The resulting developed diazo intermediate is found to be desensitized in a particularly effective manner, having an effectively stable image thereon that is substantially opaque to the radiation used in exposing diazo sheets (i.e. substantially 3500–4300 A.). It is found that the instant desensitized diazo intermediate may be used in the printing of conventional diazo prints, using conventional procedures, so as to make as many as 40 or 50 copies without any apparently significant or conspicuous "fogging" of the intermediate. In the absence of such desensitizing procedure, such "fogging" develops after several copies.

It is believed that there are certain parallel aspects between the functional advantages of the present invention and certain theories and/or established facts in connection with silver halide photography. For example, one of the important advantages of silver halide photography involves high speed which, in turn, is understood to require quantum amplification as an essential prerequisite. In the practice of the instant invention, it is also believed that advantageous results are obtained because of quantum amplification, although the theoretical basis for such quantum amplification in the practice of the instant invention is a photopolymerization concept, at least in the case of the positive-working system of the invention.

In silver photography there is a capability on the part of silver photographic systems of taking one fundamental "reaction route" in response to actinic light. In other words, when the substantial plurality of silver halide grains in a given photosensitive film or layer are exposed to actinic light certain of these grains will receive a sufficient number of photons so that they are subsequently developable to produce color, whereas others of these grains will receive and absorb *less* photons and will be found to be incapable of undergoing such color-forming development, i.e., development of black silver. This latter group of silver halide grains, however, must ordinarily be removed from the "developed picture" on the film in a subsequent step if "fixing" is to be accomplished and "subsequent fogging" is to be avoided. In other words, the last-mentioned group of silver halide grains which have received in the initial imagewise exposure an insufficient number of photons to become developable have not been rendered wholly incapable of the typical color-forming reaction of silver halides (and this could be demonstrated merely by re-exposing the film, prior to fixing).

In contrast, in the positive-working system of the instant invention, there is produced a combination $ab$ which is fully capable of undergoing two separate and distinct reactions, one of which being a color-forming reaction and the other of which being a non-color-forming reaction. In using the preferred combination $ab$ in the practice of the instant invention, the initial imagewise exposure to actinic light will determne which areas will undergo which of these two reactions. In fact, in such initial imagewise exposure of the positive-working system of the instant invention, the initially exposed or "light struck" areas of such combination $ab$ are subjected to the non-color-forming reaction, on what is believed to be the theoretical basis of photopolymerization and therefore, on a basis which involves quantum amplification. The quantum amplification is demonstrated by the speed of reaction here involved. The initially light struck areas are rendered non-color-forming in a very "short-time" initial exposure, which time-wise suggests the speeds of the silver halide systems (although at this stage of the development of the present invention it must be conceded that the maximum high speed of the most sensitive silver halide systems has not been reached, in spite of the fact that the present system is fully capable of commercially acceptable speeds for a number of uses). The mere fact that the positive-working system of the invention is capable of such high speeds, however, would appear to be conclusive evidence of the characteristics of quantum amplification in this system.

Although the reasons for such high speed and the apparent quantum amplification characteristic of the instant invention canont be fully understood at this time, one of the reasons is believed to be based upon the intimate molecular association among the molecules of the essential combination $ab$. This intimate molecular association is achieved in each individual, discrete particle of the dispersed phase, wherein the partcles themselves have average sizes in the region of one micron, which is not substantially different from silver halide particle or "grain" sizes in many commercial systems. It is believed that this close-packed, intimate molecular association of the molecules in the combination *ab* in the instant dispersed phase particles makes it feasible to obtain the quantum amplification and, therefore, high speed that is obtained in the practice of the instant invention.

Still another significant aspect of the instant invention which is believed to be a basis for the improved results is that each of these fine sized, discrete dispersed phase particles contains its activator component or element, intimately dispersed in or as an essential part of the combination *ab*, in the solid body of the dispersed phase particle in sufficient quantity so that it presents an adequate target for incident photons. Such activator component or element (in whatever form it actually takes) need not be selectively positioned within the individual dispersed phase particles. The chain-type of reaction which the instant invention contemplates in response to the initial reception of photons is such that selective location of the activator component or element throughout the dispersed phase particle is not necessary for maximum efficiency in photon absorption. The combination *ab* and/or the chain-type reacting components thereof are in such close packed molecular association in the individual particles that this chain-type reaction may be set off by the photon-absorption or activation of randomly located activator components or elements within the solid body of the particle. Of course, if the combination *ab* is truly an interaction product *ab*, which it is believed to be at least in certain preferred embodiments of the instant invention, having the dual capacity of photo-receiving activator and light-energized chain-type reactor, then the benefits in speed and quantum amplification in the close packed system of the instant invention are more readily appreciated.

Still another advantage of the instant invention is believed to be based upon the fact that the individual discrete particles of the combination and/or interaction product *ab* are so formed in the compact state that they may very well possess the "all-or-nothing" characteristic of silver halide particles or grains, in that the requisite nominal amount of light energy in the form of photons actually received by any given particle is either sufficient to substantially commit this particle irrevocably to one of the aforesaid reaction routes or, alternatively, the absorbed or received photons are insufficient in total energy to commit the whole of the particle in such condition that it is fully capable of going the other reaction route. Thus, in the silver halide systems, it is understood that the initial imagewise exposure has the net effect of committing a given silver halide grain to the color-forming development reaction, or failing to commit such silver halide grain to the color-forming reaction (thereby permitting subsequent fixing to the latter). This is believed to be an essential aspect of the production of the desired "tone" in silver halide photographs; and such tone is also obtainable in the practice of the instant invention.

In the practice of the instant invention, in the positive-working system, however, it is believed that the initial effect of actinic light is just the reverse of the effect of the effect of actinic light on the aforesaid silver halide grains. Thus, in the practice of the instant invention it is believed that the initial exposure of a given particle or "grain" of the combination *ab* may tend to commit irrevocably this particular particle to the non-color-forming reaction route, whereas particles that are not initially light struck are still capable of taking the color-forming reaction route. Whether or not the individual particle actually undergoes the "all-or-nothing" phenomenon apparently characteristic of silver halide grains may be somewhat academic, because the desired tone is obtained in positive pictures of the instant invention and this is the result desired; but the fact that such tone is obtained would suggest from at least the academic point of view that such "all-or-nothing" phenomenon occurs also in the practice of the instant invention.

Referring specifically to a preferred embodiment of the instant invention, the positive-working system, it will be appreciated that one of the starting agents *a* is preferably a vinyl-type of compound that is capable of undergoing addition polymerization, and the other agent *b* is a halogen-containing compound that is capable of responding directly or indirectly to actinic light by releasing one or more active radicals (i.e. halide radicals, acid radicals and/or the so-called "free radicals" resulting from unsatisfied carbon bonds) or ions, which radicals or ions are understood to catalyze addition polymerization. The foregoing general theory of the instant invention would appear to apply rather easily to the positive-working system of the instant invention, if the exact nature of the combination *ab* were such that it retained the individual starting agents *a* and *b* as separate and distinct but uniformly admixed entities in each discrete particle. In such instance, the particle would present a target with a substantial number of randomly located actuators *b* distributed throughout the particle and prepared to receive and absorb photons, and the particle would also present a close packed intimate molecular association between the chain-reacting polymerizable component *a* such that absorption of a sufficient number of photons by the actuator component *b* would effectively "touch off" the chain-type photopolymerization reaction hereinbefore discussed, and this chain-type reaction would be greatly facilitated by the close packing of the monomeric component *a*. In addition, the quantum amplification desired and obtained in the practice of the instant invention, on such a theoretical basis, would result in the high speed elimination of the monomeric form of the starting agent *a* in the light struck areas.

On the basis of this theory, it is only the monomeric form of the starting agent *a* that is understood to be capable of undergoing the color-forming reaction, so the desired effect of quantum amplification would be the rapid and substantial elimination of the monomers in a given light struck area by virtue of the release of the desired active radicals or ions from the actuator. In fact, in accordance with the fundamental theories of addition polymerization and, particularly photopolymerization, a single radical or ion released by a true photopolymerization actuator should be effective to produce one or more multi-unit polymers, thereby removing from the reaction scena a substantial number of monomeric molecules for each active radical or ion released. Thus, the energy required to break a given bond and release an active radical or ion is not expended solely for the formation of a new compound of this active radical or ion with only one monomeric molecule. Instead, in the practice of the instant invention this radical or ion has the net effect of reacting with many monomeric molecules. In a greatly simplified form, this is the general nature of the quantum amplification believed to be involved.

It so happens that the theory of the instant invention is not as simple as the foregoing explanation would indicate. First of all, the combination *ab* in many instances is not believed to be merely a mixture of separate and distinct molecules of agents *a* and *b* which have the separate and distinct functions hereinbefore described. It is believed that the monomeric N-vinylcarbazole *a* is capable of a color-forming reaction with carbon tetrabromide *b*. If, however, each individual radical or ion formed from the carbon tetrabromide by the action of light were involved only in the formation of a dimer or trimer of N-vinylcarbazole, the quantum amplification would appear to be much lower than it is. Instead, the fundamental theory of the invention involves what is now an unknown type of combinatiin *ab* between these starting materials which imparts to them a uniquely rapid response to light and a uniquely high quantum amplification, effecting a very rapid removal (by whatever the mechanism involved) of the color-forming monomers in the light struck areas.

Each of the individual dispersed phase particles has an extremely compact molecular structure which affords some sort of radical or "free radical" or ion travel from molecule to molecule through successive chains of molecules such that quantum amplification is apparently obtained on the basis of conventional indicia recognized in photographic studies. On the basis of a rough comparison of performance characteristics of silver halide systems and preferred embodiments of the instant invention, it is estimated that the quantum amplification achievable in the practice of the instant invention is in the neighborhood of $10^3$ or more. The significance of this achievement is apparent when one considers that the photographic speed would be some 1000 times slower in a simple dye forming system wherein two or more molecules are reacted to form a dye without the benefit of quantum amplification which is obtained in the practice of the instant invention.

In each of the dispersed phase particles, in the practice of the instant invention, we have an extremely intimate molecular association with respect to whatever the polymerizable monomeric materal or component may be, so that once catalyzed, accelerated and/or activated the polymerization reaction may take place quite readily in the solid state that is normal for the dispersed phase during the photographic process. In this respect, heating of the film prior to imagewise exposure in some instances is found to improve the sensitivity, which might indicate that additional molecular mobility in the solid state system facilitates the photopolymerization process which is believed to take place.

One additional, and particularly important aspect of the invention is that the combination $ab$ of the invention has the more or less unique characteristic typical of silver halide systems in that the films of the invention find true photographic response to visible light. It is known that a number of different materials find response to light other than the visible or normal daylight; but it will be appreciated that unless a system finds photographic response to ordinary daylight, it lacks the advantage of the present-day silver halide systems for use in conventional (daylight) photography. The daylight or visible light response of the films of the instant invention is additionally comparable to that of silver halide systems in that films of the instant invention may be given a short imagewise exposure to visible light and then retained for a substantial period of time, i.e., at least a substantial number of days, before being processed to develop the film. The important advantage over silver halide systems in this respect is that the films of the invention are developed by the dry process hereinbefore described, e.g., involving a blanket ultraviolet light exposure, usually plus heat exposure.

EXAMPLE 34

The procedure of the various runs of Example 1 is repeated except that the agents $a$ and $b$ are precombined in solid form and a pre-combination $ab$ is obtained by physically combining these materials under carefully controlled conditions to avoid what appears to be a rather violent exothermic reaction. These two agents appear to combine or fuse very readily, even in solid mixture at room temperature on standing; but such mutual fusion should be controlled (e.g. by avoiding substantial heating of the mixture above about room temperature), in order to avoid loss of photosensitivity in the combination $ab$ which appears to be evidenced by overheating and conversion to a black mass, if the mixture is not actually cooled during such fusion. The resulting photosensitive pre-combination $ab$ is then in the form of a light yellow viscous mass and added as such at the same time that ingredient $a$ was added alone to the gelatin-aqueous system $c$ described in the runs of Example 1, and it is found that a substantially uniform emulsion otherwise having the properties hereinbefore described in Example 1 is formed somewhat more quickly under the conditions of violent agitation and heating in the Waring blender, which is packed in ice such that heating to only about 40° C. is obtained. The difficulty in controlling the tendency for the two agents $a$ and $b$ to react together to too great an extent in pure form is, however, compensated to some extent by the greater ease with which the uniform emulsion is obtained. On the other hand, the procedure of Example 1 affords a better method of controlling the tendency for agents $a$ and $b$ to combine, chemically or otherwise. The film resulting from the procedures of this example are found to have substantially the superior photosensitivity of the photographic films of the invention hereinbefore described.

EXAMPLE 35

A composition of 10 g. of N-vinylcarbazole, 10 g. of carbon tetrabromide and 16 g. of gelatin in 150 ml. of water is charged directly into a ball mill (without the use of the Waring blender treatment and/or heating hereinbefore described) and is subjected to ball milling at relatively low temperatures, not substantially in excess of about room temperature, for a period of time (e.g. about one hour) sufficient to obtain a fairly uniform dispersion wherein the dispersed phase particle sizes have an average particle size substantially within the range of 5 to 20 microns and a photographic film from such ball milled dispersion is prepared by the procedure described in connection with run 1A for purposes of comparing the results. Examination of the film reveals that the dispersed phase particles are more coarse than those previously described but the agents $a$ and $b$ have apparently fused together during the ball milling to obtain generally rounded particles, apparently because of the very great affinity which these two particular agents $a$ and $b$ have for each other even at room temperature. Also, it will be found that the ball milled dispersed phase particle size is less uniform. Nevertheless, the ball milled product is found to be operative and may have some advantages in certain uses, in that the aqueous-gelatin continuous phase $c$ system affords a number of advantages in formulation and use. This aqueous continuous phase $c$ is distinctly superior to, for example, a film obtained by drying a solution containing not only the film-forming binder dissolved therein but also the agents $a$ and $b$. In such a solution system, it is found that there are a number of distinct disadvantages in photosensitivity, shelf life, stability, economic and practical handling aspects, etc., whereby the advantages of the invention are readily demonstrated.

EXAMPLE 36

Run 36A

A charge of 5 g. of carbon tetrabromide is dispersed in 2 ml. of acetone, and to this mixture is added a charge of 5 g. of N-vinylcarbazole. The resulting mixture is then added to a continuous phase $c$ formed of 8 g. of gelatin in 29 ml. of water and violently agitated at high speed in a Waring blender, and the temperature thereof rises gradually from about 45° C. after one minute to about 72° C. after 16 minutes.

Samples of the emulsion are withdrawn after 1, 2, 4, 8 and 16 minutes of such agitation and filmed and tested as described in Example 1. It is found that films prepared from samples withdrawn after 1, 2 and 4 minutes of agitation give a weak positive picture; whereas films prepared from samples withdrawn after 8 and 16 minutes do not give a picture.

Run 36B

The procedure of run 36A is repeated using 2 ml. of benzene instead of acetone, and withdrawing and filming samples only after 2 and 16 minutes of agitation. Film made from the 2-minute sample is found to give a good positive picture; whereas film made from the 16-minute sample gives no picture.

The foregoing demonstrates that prolonged heating and/or agitation of the instant combination *ab* apparently results in a loss of the desired photosensitivity, particularly in the case of the instant agents *a* and *b* which are lightly reactive at room temperature.

In addition it would appear that small amounts of comparatively volatile solvents such as acetone and benzene may assist in controlling the temperature of the violently agitated emulsion. The water-immiscible benzene, however, appears to perform better than the water-miscible acetone in this particular system.

EXAMPLE 37

The pre-melt of Example 33, obtained by initially melting or fusing together the N-vinylcarbazole and the carbon tetrabromide under carefully controlled conditions, does result in the essential homogeneity of what appears to be a solid solution of the two agents and/or consisting primarily of a chemical complex, or perhaps varying degrees or stages of chemical combination or complex formation, resulting from the mutual fusion. The mutually fused combination *ab* thus obtained may also be added in the proportions hereinbefore described to the continuous phase *c* of Example 1 in a ball mill, with ball milling at the normal comparatively low ball milling temperatures e.g. 30 to 40° C. in order to obtain an average particle size that is substantially the same as that described in Example 34. The resulting particles appear to be spheroidal or rounded in shape. It will be appreciated that the ball milling can be carried out at slightly higher temperatures with resultant more effective melting of the dispersed phase, thereby carrying out a form of violent agitation of an emulsion at elevated temperatures, in order to bring out the better characteristics of the procedure of the invention. The rounded particles thus obtained at apparently lower ball milling temperatures would appear to be caused by localized warming in the ball mill and/or further room temperature fusion of the highly reactive agents *a* and *b*. The resulting film is found to have fair photosensitivity.

In this respect, however, it will be noted that photosensitivity is exhibited by the various films prepared in accordance with Examples 1 through 6 hereof, but in the preferred embodiments hereinbefore described and hereinafter referred to, the best results and the best controls of positive-working procedure are effected. In addition, it should be mentioned that particularly in the case of the specific agents *a* and *b* of Examples 1 through 6, the aqueous gelatin continuous phase *c* contributes to the optimization of the overall photographic film, such that the aqueous gelatin system has been found to be preferred for this specific use of the continuous phase *c*. This is believed to be a result of unusual compatibility and/or adatability of the aqueous gelatin system to the various measurable as well as theoretical concepts of the invention.

EXAMPLE 38

A charge of *a* 10 g. of N-vinylcarbazole and *c* 100 ml. of a 15% polyvinyl alcohol solution in water ("Elvanol 51-05") is violently agitated at high speed in a Waring blender, with heating up to a temperature of 70 to 72° primarily as a result of the dispersing effect of the blender over a period of 10–15 minutes, with such high speed agitation being continued at such temperature for a time (e.g. 2–3 minutes) sufficient to obtain a substantially uniform emulsion (as evidenced by the previously described smear test). Next, a charge of *b* 5 g. of carbon tetrabromide is added to the blender with continued high speed agitation at the temperature of 70–72° C. until a substantially uniform emulsion is again obtained, which takes about one minute, and the blender agitation speed is then slowed down for initial cooling of the emulsion and the emulsion is applied while still fluid as a one-half mil (wet thickness) film onto sheets of baryta- coated paper (using the Bird application technique). The coated sheets of paper are dried for about one-half hour by standing in a dark room. Examination of the solidified dispersed phase particles in the continuous phase reveals that they are substantially spherical and substantially uniformly sized very fine particles, having substantially the particle sizes hereinbefore described. The sheets of paper coated with the photosensitive film composition thus prepared are employed in a procedure that is substantially the same as that described in connection with the positive-working system of run 1A and it is found that a very good positive picture is obtained.

The foregoing procedure of this example is carried out, except that the continuous phase *c* employed is a 15% gelatin solution in water instead of the polyvinyl alcohol solution. The results obtained are superior in respect to photosensitivity and clarity of the positive picture produced, and the actual blending of the emulsion appears to be very easily carried out, thereby indicating a definite preference for the use of gelatin as the substantially transparent-solid-film-forming component of the continuous phase *c*.

For comparison, the chemical formulation employed in the previous paragraph is used in a ball milling process to obtain a comparable average dispersed phase particle size, after rather prolonged ball milling at temperatures of about 30–35° C., and it is found that the results obtained are distinctly inferior not only to those obtained in the procedures of the previous paragraph, but also substantially inferior to those obtained in carrying out the initial procedure of this example, using the polyvinyl alcohol solution as the continuous phase *c*.

EXAMPLE 39

A charge of *a* 6.2 g. of N-vinylcarbazole and *c* 5.6 g. of gelatin, 2.7 g. of hydroxypropylmethylcellulose ("Methocel-Hg") in 32 ml. of water is violently agitated at high speed in a Waring Blendor, with heating up to a temperature of 70–72° C. primarily as a result of the dispersing effect of the blender over a period of 10–15 minutes, with such high speed agitation being continued at such temperature for about 2 or 3 minutes, which is sufficient to obtain a substantially uniform emulsion. A charge of 2.1 g. of carbon tetrabromide *b* is then added to the blender with continued high speed agitation at the temperature of 70–72° for 1 or 2 more minutes until a substantially uniform emulsion is obtained, whereupon the blender speed is cut down to allow initial cooling and the resulting dispersion is applied to sheets of baryta-coated paper in half mil (wet thicknesses) in the manner previously described, and the films are allowed to dry in a dark room for about one-half hour, at which time the film surface is dry to the touch.

EXAMPLE 40

A procedure is carried out that is the same as that described in the previous Example 39, except that the materials used are as follows:

| | | |
|---|---|---|
| Gelatin | g | 6 |
| Ammonium alginate | g | 1 |
| N-vinylcarbazole | g | 9 |
| Carbon tetrabromide | g | 2.5 |
| Water | ml | 25 |

EXAMPLE 41

Another procedure is carried out that is the same as that of Examples 39 and 40, except that the formulation used is as follows:

| | | |
|---|---|---|
| Commercial starch ether ("Ceron N") | g | 3.5 |
| Gelatin | g | 1 |
| N-vinylcarbazole | g | 6.2 |
| Carbon tetrabromide | g | 3 |
| Water | ml | 35 |

The baryta-coated paper sheets with films of the foregoing Examples 38 through 41 applied thereto in the manner described are exposed to a "Kodachrome" projection image for 1–2 seconds, and then developed with blanket exposure to an ultraviolet source (e.g. a blacklight source of about 3000–4000 A.) and heat. A positive image was obtained in the case of each of these and it is found that the formulations containing gelatin as the principal (i.e. more than 50% by weight) solid film-forming component of the continuous phase seem to be superior in performance.

EXAMPLE 42

A charge of *a* 10 g. of N-vinylcarbazole and *c* 100 g. of a 15% aqueous solution of gelatin is violently agitated at high speed in a Waring Blendor, with heating up to a temperature of 70–72° C. primarily as a result of the dispersing effect of the blender over a period of 10–15 minutes, with such high speed agitation being continued at such temperature for 2 or 3 minutes, sufficient to obtain a substantially uniform emulsion as previously described.

A charge of 33 g. of carbon tetrabromide was previously dissolved in a solvent blend consisting of 10 ml. of paraxylene and 10 ml. of ethyl ether, and a white para-xylene-carbon tetrabromide complex precipitated from the solution upon standing overnight.

A charge of *b* 10 g. of the aforesaid para-xylene-carbon tetrabromide complex is added to the blender containing the previously described uniform emulsion at about 70–72° C., and violent agitation was continued for only one minute, and the emulsion was then immediately cooled and filmed at a one-half mil wet thickness on baryta-coated paper.

In each of Examples 39 through 42, the films on the paper are dried for about one-half hour by standing in a dark room, and then sheets of each type are exposed to a (500 w. tungsten lamp) positive color transparency projection (4½ diameters) for 2 seconds; and each sheet is then developed with a blanket exposure to a set of two 15 w. black-light blue lamps for 15 seconds, followed by sufficient heat (about 90° C.) to bring out the positive blue.

EXAMPLE 43

A charge of *a* 10 g. of N-vinylcarbazole, and *c* 95 ml. of a 15% aqueous solution of gelatin, plus 50 ml. of a 15% colloidal silica dispersion ("Ludox-Sm") is violently agitated at high speed in a Waring Blendor, with heating up to a temperature of 70–72° C. for a time sufficient to obtain a substantially uniform emulsion. Next, a charge of *b* 10 g. of carbon tetrabromide, plus 1 drop of formalin is added to the blender with high speed agitation at the temperature of 70–72° C. continued for a few minutes more to obtain reformation of a substantially uniform emulsion, which is then cooled at a reduced agitation rate and applied as a ½ mil (wet thickness) filmed to sheets of baryta-coated paper. The sheets of paper are dried by standing for ½ hour in a dark room.

The dried sheets are then cut into 4" by 5" size sheets and loaded into 4" by 5" film holders. The cut sheets are then exposed in a Busch Pressman camera (at *f*4.7) for ½, 1 and 2 seconds to an outdoor scene in an afternoon sun. The exposed sheets are developed with a blanket exposure of a pair of 15 w. black-light-blue lamps for 15 seconds, followed by a blanket exposure to an infrared lamp to develop the positive picture. Positive pictures of the original scene are obtained.

The positive pictures thus obtained appear to have improved picture quality by virtue of the incorporation of the colloidal silica, among other things, and it will be appreciated that in the practice of the instant invention a separate and distinct non-photosensitive or non-photographic dispersion may be employed in the practice of the instant invention, particularly collidal type dispersions of very fine sized substantially inert, insoluble particles generally of inorganic material. Such particles include very fine sized silica, clays, etc. having colloidal sizes (i.e. from about 1000 A. down to about 100 A.). In this respect such dispersed phase of inert material is distinguishable from the dispersed phase of previously described combination *ab*, and the dispersed phase of silica or similar inorganic fine particle materials is not ordinarily fusible with the agents *a* or *b*, and ordinarily these inorganic fine particle dispersions, such as colloidal silica, are not particularly compatible with the distinctly hydrophobic combination *ab*, so that they would remain as an entirely separate and distince non-photosensitive dispersed phase (but even if some of the individual colloidal silica particles were actually enveloped in the fused combination *ab*, in the systems herein demonstrated, the superior properties of the invention are not impaired). It will be appreciated that any silica particles of even the silica gel size here employed will remain substantially integral per se and will not actually enter into the intimate molecular association or homogeneity of solid solution characteristics which is believed to be obtained within the fused combination *ab*. It will be appreciated that, even if the solid fused combination *ab* is no longer a true solid solution, the mutual fusion of agents *a* and *b* may and probably does involve substantial miscibility in the liquid state, and the separation of one of these agents out in a matrix of the other during solidification of these fine particles will still result in the essentially molecular intimacy and homogeneity described as being characteristic of a solid solution for the essential purposes of this invention.

It will thus be appreciated that the colloidal size inorganic displaced particles such as the silica which may be used to advantage in the practice of the instant invention are not as such photosensitive; and it will also be appreciated that such fine sized inorganic silica particles will remain to a substantial extent at least in the continuous phase, as will be true of many of the solid film-forming "water-soluble" components, which are quite probably very fine dispersions of large size polymeric molecules or similar clusters of molecules in the aqueous phase system. It will thus be appreciated that reference to the film formers of the continuous phase as being "water-soluble" or reference to the continuous phase as being an aqueous solution of such film-forming material as gelatin, starch, polyvinyl alcohol, etc. is used herein advisedly, since it is appreciated that eminent authorities in various fields are not in complete agreement as to whether or not these particular materials are actually dissolved in an aqueous system. Nevertheless, the essential film-forming components of the continuous phase *c* used herein are in most cases soluble or so finely dispersible in the concentrations of use that for practical purposes there is no distinction between solution and dispersion, and the continuous phase *c* is thus defined as a continuous liquid or solid phase, as the case may be, on the basis of the practical fact that these various starch, gelatin, polyvinyl alcohol and the like aqueous "solutions" behave essentially as solutions in the practice of the instant invention and they be have essentially as a continuous phase (and for most functional purposes the colloidal silica used therein does also); whereas the photosensitive combination *ab* does behave distinctly as a clearly recognizable dispersed phase and it is this dispersed phase that is of primary interest in obtaining the superior results of the instant invention.

It will be appreciated that any of the hereinbefore described solid film-forming components, in its conventional "water-soluble" form can be used in place of, for example, the gelatin in the formulation of Examples 39, 40 and 41 in order to obtain the advantageous results of the invention; or in place of the hydroxypropylmethylcellulose in the formulation of Example 39 hereinbefore given. Or, in the case of the various water-soluble synthetic resins, any of such materials may be used in 15% aqueous solution to replace the polyvinyl alcohol in Example 38. For example, commercially available substantially non-aqueous butylated urea-formaldehyde and butylated melamine-formaldehyde can be used with pre-fused agents (*a* and *b*) in the procedure of Example 38, to replace the aqueous polyvinyl alcohol system employed there, using a 15% solids butylated urea-formaldehyde resin in a 50–50 ethanol-butanol solvent system.

It will be appreciated that carbon tetrabromide has some solubility in alcohols, so it is definitely preferred to employ a pre-fused combination of the N-vinylcarbazole and the carbon tetrabromide, and in so doing the system is cooled down as soon as the uniform emulsion is obtained, so as to minimize any tendency for the alcoholic continuous phase to extract carbon tetrabromide from the complex or combination of pre-fused agent *a* and *b*. As previously indicated, the fused combination *ab*, if reduced to substantially the desired average particle size, can be incorporated in a suitable continuous phase, such as the instant alcoholated coating resin system, at relatively low temperatures, with less difficulty, but the dispersed phase particles may not be used and/or solidified in situ and (even though photographically functional) this system is not preferred.

EXAMPLE 44

A charge of 5 g. of diphenylamine and 10 g. of corn starch in 90 ml. of water is violently agitated at high speed in a Waring Blendor, with heating up to a temperature of 58–60° C., to obtain a substantially uniform emulsion (the melting point of diphenylamine being 54° C.); and a charge of 0.5 g. of carbon tetrabromide is added to the blender with continued high speed agitation at the temperature of 58–60° C. for 1–2 minutes to reform the uniform emulsion, and the material is then cooled initially with slow speed agitation and filmed (1 mil wet thickness) onto baryta-coated paper and, after the film has dried, it is found to be photosensitive in response to actinic light in the range of about 2700–4800 A., in a negative-working system. The particle size of the dispersed phase is found to be very fine. The various other members of the general class of aryl amines which react with the members of the general classes of halogen-containing organic compounds described in said Waring patents, may be used as starting agents in the practice of the instant invention, particularly in the case of such starting materials which are normally solids. The solid materials are preferred for use in the instant invention, be cause the dispersed solid phase in the resulting film is generally found to have superior stability and photographic properties for practical purposes. In addition, the normally solid starting agents are now combined, in accordance with the practice of the instant invention, for the first time in a suitable concentration of the ingredients in the intimate molecular association hereinbefore described, in order to obtain unique photosensitivity, as well as unique control of the system with respect to continuous phase components as well as dispersed phase components, particle size, particle shape, etc.

The general class of color forming aryl amines described by Wainer (as amines wherein the amine nitrogen is attached to a nuclear carbon atom in an aryl group, e.g. phenyl) and the aromatic N-containing compounds described by Wainer (e.g. wherein N is contained in a heterocyclic ring conjugated with a benzene nucleus) may be used in the practice of the invention. Normally solid compounds are preferred for use in the practice of the instant invention.

EXAMPLE 45

The procedure of Example 44 is repeated employing in place of the diphenylamine in equal proportions of indole (melting point 52° C.), which had been pre-fused with the carbon tetrabromide, to form a yellow combination *ab*, in an effort to minimize the effect of water-solubility of the indole, and the violent agitation in this case in the Waring Blendor is carried out just to the initial whitening of the blend, indicating the formation of the emulsion, and then cooled and filmed. The resulting dried film exhibits good color-forming photosensitivity, developing a salmon orange color (after being light struck with near ultraviolet light, in the negative-working systems).

EXAMPLE 46

The procedure of Example 45 is repeated using iodoform in place of the carbon tetrabromide, and again the results indicate that measure of control of the particle size, photosensitivity, and the like essential aspects of photosensitive film formation are obtained; and the system demonstrates fair photosensitivity and a red color is obtained in the negative-working process.

EXAMPLE 47

The procedure of Example 46 is repeated using hexachloroethane in place of the iodoform, and it is found that there is no apparent premature reaction between the halogen compound and the indole; and a weak yellow color is obtained by exposure to near ultraviolet light in the negative-working system.

EXAMPLE 48

A charge of 5 g. of N-vinylcarbazole and 8 g. of gelatin and 29 ml. of water is violently agitated at high speed in a Waring Blendor, with heating up to a temperature of 70–72° C. primarily as a result of the dispersing effect of the blender, after uniform emulsion is obtained, 5 g. of iodoform is added with the violent agitation continued for 1–2 minutes to assure uniform emulsion and then the emulsion is promptly cooled and filmed on baryta paper (½ mil wet thickness). The photosensitivity of the resulting film is demonstrated using a light source with a spectrum including ultraviolet and visible light.

EXAMPLE 49

The procedure of Example 48 is repeated using hexachloroethane, and it is found that, using a near ultraviolet (3000–4000 A.) actinic light, a latent image is obtained, which is developed with heating to about 350° F., in the negative-working system.

The various systems of Examples 44 through 49 have been employed to represent embodiments wherein actinic light of different wavelengths finds photosensitive response. The selection of the halogen-containing compound and the selection of the N-containing aromatic compound within certain rather wide ranges permit the formation, in the practice of the instant invention of a dispersed phase combination that is photosensitive to various selected wavelengths which often include visible light. In most instances, the systems are particularly photosensitive to ultraviolet in the region of about 3500 to 4000 A. Whatever the particular most selective actinic light wavelength for any given system might be, in the practice of the instant invention the dispersed phase is formed from separate, preferably solid starting agents. Such individual starting agents will have their own peak absorptivity at one or more selected wavelengths, and it is found that the combination obtained in the dispersed phase in the practice of the instant invention also appears to have selective peaked absorptivity of its own distinctive character. Sometimes such peak absorptivity will be essentially that of a predominating starting agent, but it is understood to be a different and distinct in its light absorptivity from that of the starting agents used in the combination. Also, once the dispersed phase combination has undergone the ultimate reaction in response to actinic light and/or heat in the manner hereinbefore described, such dispersed phase reaction product then acquires still a new, different and distinct selective absorptivity. The term "reaction product" is used advisedly, since it is understood that there is a definite chemical reaction, over and beyond any chemical reaction or complex formation which takes place in the formation of the original combination in the unreacted dispersed phase, and this chemical reaction is a photo-chemical reaction which does produce a separate and distinct selective light absorptivity. In many instances this selective light absorptivity is within the visible light range, and distinct new color formation takes place. In other instances, it will be found that the more pronounced change and/or increase in selective light absorptivity takes place in the ultraviolet or blue light ranges and the change is not quite so apparent visibly, although the presence of the image is clearly discernible by conventional techniques.

The various systems of Examples 44 through 49 are subjected to actinic light in an imagewise projection initially for purposes of demonstrating a negative-working system, i.e., a system wherein the light areas of the original image appear as darker colored areas on the photosensitized film, and the dark areas of the original image are made to appear as light (non-chemically reacted) areas. The negative-working system is carried out merely by a single imagewise exposure using actinic light, concurrently with or possibly followed by heating to effect a more complete development, and then preferably followed by a fixing procedure to deactivate or remove unreacted photosensitive material in the film.

EXAMPLE 50

A charge of 10 g. of aniline, 10 g. of 40% formaldehyde and 2 g. of iodine (prepared in accordance with the procedure of Beebe Patent No. 1,587,272, page 2, line 39) was reacted to obtain a reddish-brown viscous substance; and 10 g. of this substance with 3 g. of iodoform are blended in the Waring Blendor with a continuous phase of 8 g. of gelatin in 25 ml. of water to obtain a uniform emulsion which is filmed to obtain a photosensitive orange-colored layer, which gave a brown printout image, in a negative-working process, using a near ultraviolet imagewise exposure.

EXAMPLE 51

A procedure is carried out that is the same as that of Example 33, except that the agent $b$ used is 0.5 gram of pentabromoethane, and after the initial imagewise exposure to the microfilm negative using the mercury arc lamp as a light source, the resulting diazo intermediate is developed by heating to substantially 225° F. for about 15 seconds. Desensitizing with ammonia is carried out in the manner described in Example 1, and the resulting developed diazo intermediate is found to be effectively protected against "fogging" and capable of printing 40 to 50 diazo prints without apparent "fogging."

The image obtained in the resulting diazo intermediate is, however, more of a yellowish-brown color than that obtained in Example 33.

EXAMPLE 52

A procedure is carried out that is the same as that of Example 33, except that the agent $b$ used is 0.25 gram of carbon tetrabromide (and the resulting combination $ab$ before it is exposed has a slight yellow cast), the imagewise exposure with the mercury arc lamp is carried out for only 5 seconds, and the resulting diazo intermediate is developed by heating to substantially 225° F. for only 2–3 seconds and a greenish-black image develops. If the heating at 225° F. is continued for 15 seconds, the image develops a yellow-brown color; and this latter developed diazo intermediate is then desensitized with ammonia in the manner described in Example 33.

On the other hand, the sheet with a greenish-black image (i.e. heated for only 2–3 seconds at 225° F.) is converted to a diazo intermediate by the same ammonia desensitizing process hereinbefore described, except that image changes in color during the process (to the yellow-brown image of the previous paragraph).

EXAMPLE 53

A procedure is carried out that is the same as that of Example 33 except that the agent $b$ used is a combination of 0.5 gram of hexachloroethane and 0.1 gram of carbon tetrabromide (and the resulting combination $ab$ before it is exposed has a slight yellow cast), the imagewise exposure with the mercury arc lamp is carried out for only 2 seconds, and the resulting diazo intermediate is developed by heating to substantially 35° F. for only one-half second and a greenish-black image develops. If the heating at 350° F. is continued for five seconds, the image develops a brown color (more typical of that obtained in Example 33); and this latter developed diazo intermediate is then desensitized with ammonia in the manner described in Example 33.

The sheet with the greenish-black image (i.e. heated for only one-half second at 350° F.) is, of course, converted to a diazo intermediate by the same ammonia desensitizing process described in Example 52, with a corresponding color change during the process to the brown image described in the previous paragraph.

EXAMPLE 54

A procedure is carried out that is the same as that of Example 53, except that the initial development by heating is carried out by heating only to 195° F. for about 15 seconds, and a greenish-black image develops (comparable to the greenish-black image described in Example 52). This greenish-black image is, likewise, converted to the previously described brown image by processing in the ammonia chamber while it is simultaneously desensitized in accordance with the previous procedure.

EXAMPLE 55

A procedure is carried out that is the same as that of Example 52 in connection with the preparation of the initial photosensitive film. This photosensitive film is then subjected to an imagewise exposure using a 300 w. Bell & Howell Headliner Slide Projector (which uses a 300 w. tungsten lamp as its light source). The imagewise exposure is carried out for 30 seconds; and this is followed by a blanket ultraviolet exposure using two 15 w. Sylvania black-light-blue tubular lamps for 15 seconds; and the resulting latent image is then developed by heating to 195° F. for 15 seconds, to obtain a greenish-black image, which is a positive image from a positive image in the original headliner projector.

The foregoing positive image may be desensitized then with ammonia in the procedure hereinbefore described, but preferably it is originally developed at a temperature of 225° F. for 15 seconds, in which case the positive image obtained is yellow-brown in color, and this yellow-brown colored positive image is desensitized in the (hot) ammonia desensitizing treatment hereinbefore described without significant change in the yellow-brown color; whereas the previously described greenish-black image will develop this same yellow-brown color in the ammonia fixing process just described. The result in either case is a stable, photographically desensitized positive image which is used as a diazo intermediate, in an otherwise conventional diazo printing procedure to make 40 to 50 copies without any apparent "fogging" or loss of stability.

EXAMPLE 56

The procedure of Example 33 is repeated and substantially the same results are obtained using the following compositions:

Run 56A:
    5 g. N-vinylcarbazole
    10 g. corn starch
    90 g. water
    5 drops glycerine
    6 ml. of 0.5 g. hexachloroethane dispersed in methanol
Run 56B:
    Same as Run 56A; but using 0.5 g. of hexachloroethane in isopropanol (using total of 6.5 ml.)
Run 56C:
    Same as Run 56A; but using 0.5 g. of hexachloroethane crystals, without dispersant (butyl glycerine increased to 10 drops).

Run 56D:

Same as Run 56C; except that hexachloroethane is replaced with 0.35 g. of pentabromoethane, the glycerine is replaced with Antifoam B (2 drops) and the developing temperature is only 225° F.

Although the N-vinylcarbazole-carbon tetrabromide system may be unique in its chemical affinity between the agents, it should be understood that the preferred mutual fusion of the dispersed phase agents *a* and *b* is greatly facilitated in this system. For example, separately prepared emulsions of N-vinylcarbazole and carbon tetrabromide may be combined by routine mixing at temperatures as low as room temperature and (while permitting the nominal mobility of the dispersed phases which results in retention of a fairly fluid continuous phase) it will be found that in a reasonably short time the mutual fusion of the separate dispersed phase particles *a* and *b* is accomplished to obtain the photosensitive combination *ab* of the invention. In the sense that lower temperatures are used, this procedure has advantages, even though time elements, production control, etc. may be less practical.

In contrast, repetition of a comparable experiment with hexachloroethane, iodoform, pentabromoethane and/or most other halogen compounds *b* will not result in the comparable mutual fusion and/or creation of the photosensitive combination *ab* hereinbefore described. Apparently reheating (and/or conceivably catalysts by addition of small amounts of carbon tetrabromide or possibly some "non-agent" type of catayst) is necessary in order to obtain the desired mutual fusion. In this respect, also, the inclusion of substantial amounts of water-immiscible solvents or diluents (i.e. particularly with the use of amounts of solvents greater than or even as great as the total weight of the agents), it is usually found that there is actual interference with (rather than catalysis) of the mutual fusion, and this can be demonstrated even with the carbon tetrabromide N-vinylcarbazole system, if sufficient amounts of diluent and/or solvent are employed.

It will be understood that modifications and variations may be effected without departing from the spirit and scope of the novel concepts of the present invention.

We claim as our invention:

1. A method of producing a photographic material which comprises dispersing (1) an aryl amine free from nuclear substitution in the position para to nuclear attachment of said amine nitrogen atom, and (2) an organic halogen compound selected from the group of compounds which produce free radicals or ions upon exposure to light of a suitable wavelength and in which there is present at least one active halogen selected from the groups consisting of chlorine, bromine and iodine, attached to a carbon atom having not more than one hydrogen atom attached thereto, in (3) an aqueous dispersion medium formed of a solid-hydrophilic-film-forming vehicle, in which said nitrogen atom-containing compound and said organic halogen compound are substantially insoluble, and effecting formation of discrete globules of a light-absorbing combination of said aryl amine and said organic halogen compound, said combination being responsive to actinic light to yield an image of selective light absorptivity distinct from that of said combination and said aryl amine and organic halogen compound.

2. A method of producing a photographic material which comprises dispersing (1) an N-vinyl compound, and (2) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto, in (3) an aqueous dispersion medium, formed of a solid-hydrophilic-film-forming vehicle, in which said N-vinyl compound and organic halogen compound are substantially insoluble, and effecting formation of discrete globules of a light-absorbing combination of said N-vinyl compound and said organic halogen compound, said combination being responsive to actinic light to yield an image of selective light absorptivity distinct from that of said combination and said N-vinyl compound and organic halogen compound.

3. A method of producing a photographic material which comprises dispersing N-vinylcarbazole and carbon tetrabromide in a continuous liquid phase formed of an aqueous solid-hydrophilic-film-forming vehicle and effecting solidification of descrete globules of a light-absorbing combination of said N-vinylcarbazole and said carbon tetrabromide.

4. A composition comprising (1) a photosensitive dispersed phase in the form of discrete globules of a combination of (a) an aryl amine free from nuclear substitution in the position para to nuclear attachment of said amine nitrogen atom, and (b) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto, in (2) an aqueous dispersion medium, of a solid-hydrophilic-film-forming vehicle in which said dispersed phase is substantially insoluble, said combination being responsive to actinic light to yield an image of selective light absorptivity distinct from that of said combination and said nitrogen atom-containing compound and organic halogen compound.

5. A composition comprising (1) a photosensitive dispersed phase in the form of discrete globules of a combination of (a) an N-vinyl compound and (b) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto, in (2) an aqueous dispersion medium, or a solid hydrophilic-film-forming vehicle in which said dispersed phase is substantially insoluble, said combination being responsive to actinic light to yield an image of selective light absorptivity distinct from that of said combination and said N-vinyl compound and organic halogen compound.

6. The composition of claim 5 wherein said dispersion medium is selected from the group consisting of gelatin, casein, polyvinyl alcohol, gum arabic, starch, sodium carboxymethylcellulose and hydroxyethylcellulose.

7. A composition comprising (1) a photosensitive dispersed phase in the form of discrete globules of a combination of (a) a nitrogen atom-containing compound selected from the group consisting of N-vinyl carbazole, N-ethyl carbazole, indole and diphenylamine, and (b) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto, in a (2) aqueous dispersion medium, of a solid hydrophilic-film-forming vehicle in which said dispersed phase is substantially insoluble, said combination being responsive to active light to yield an image of selective light absorptivity distinct from that of said combination and said nitrogen atom-containing compound and organic halogen compound.

8. The composition of claim 6 wherein said N-vinyl compound is capable of undergoing two separate and distinct reactions on exposure to actinic light and in the presence of said organic halogen compound.

9. A composition consisting essentially of (1) a photosensitive dispersed phase in the form of substantially fine spheroidal solid particles of N-vinylcarbazole and carbon tetrabromide fused into a mild yellow substantially homogeneous combination in (2) an aqueous, substantially translucent continuous solid-hydrophilic-film-forming phase in which the dispersed phase is substantially insoluble, said combination being selectively photo-reactive to produce a coloring agent and to produce a photo-insensitive agent of substantially the same visible appearance as said photosensitive combination.

10. A composition consisting essentially of (1) a photosensitive dispersed phase in the form of subtantially fine spheroidal solid particles of N-vinylcarbazole and hexachloroethane fused into a substantially colorless homogeneous combination in (2) an aqueous, substantially translucent continuous solid - hydrophilic - film - forming phase in which the dispersed phase is substantially insoluble, said combination being selectively photo-reactive to produce a coloring agent and to produce a photo-insensitive agent of substantially the same visible appearance as said photosensitive combination.

References Cited
UNITED STATES PATENTS

| | | | |
|---|---|---|---|
| 3,042,517 | 7/1962 | Wainer | 96—90 |
| 3,042,519 | 9/1962 | Wainer | 96—90 |
| 3,090,697 | 5/1963 | Lawton et al. | 117—36.7 |
| 3,140,947 | 7/1964 | Foris | 96—48 |

NORMAN G. TORCHIN, Primary Examiner

R. E. FICHTER, Assistant Examiner

U.S. Cl. X.R.

96—90; 117—34